United States Patent
Yang et al.

(10) Patent No.: US 9,986,511 B2
(45) Date of Patent: May 29, 2018

(54) METHOD AND DEVICE FOR TRANSMITTING UPLINK SIGNAL IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/113,359

(22) PCT Filed: Jan. 22, 2015

(86) PCT No.: PCT/KR2015/000673
§ 371 (c)(1),
(2) Date: Jul. 21, 2016

(87) PCT Pub. No.: WO2015/111931
PCT Pub. Date: Jul. 30, 2015

(65) Prior Publication Data
US 2017/0013563 A1    Jan. 12, 2017

Related U.S. Application Data

(60) Provisional application No. 61/930,441, filed on Jan. 22, 2014, provisional application No. 61/933,286, (Continued)

(51) Int. Cl.
H04W 52/14    (2009.01)
H04W 52/34    (2009.01)
H04W 52/36    (2009.01)

(52) U.S. Cl.
CPC ....... H04W 52/146 (2013.01); H04W 52/346 (2013.01); H04W 52/367 (2013.01)

(58) Field of Classification Search
None
See application file for complete search history.

(56) References Cited

U.S. PATENT DOCUMENTS

2014/0105141 A1* 4/2014 Noh ............... H04W 52/04 370/329
2015/0358915 A1* 12/2015 Semaan ......... H04W 52/146 370/329

OTHER PUBLICATIONS

Ericsson, "Considerations on power control for Dual Connectivity," 3GPP TSG-RAN WG2 #84, R2-134234, San Francisco, USA, Nov. 11-15, 2013, pp. 1-4.

(Continued)

*Primary Examiner* — James Yang
(74) *Attorney, Agent, or Firm* — Birch, Stewart, Kolasch & Birch, LLP

(57) ABSTRACT

The present invention relates to a wireless communication system, particularly, a method comprising: adjusting transmission power of one or more cells within a first cell group such that transmission power of the first cell group does not exceed a maximum power value set in the first group; adjusting transmission power of one or more cells within a second cell group such that transmission power of the second cell group does not exceed a maximum power value set in the second group; additionally reducing the transmission power of the first cell group and the second cell group if total transmission power of the whole cell group including the first cell group and the second cell group exceeds a maximum power value set in the terminal; and performing uplink transmission in the first cell group and the second cell group by using the additionally reduced transmission power, and a device therefore.

8 Claims, 11 Drawing Sheets

Related U.S. Application Data filed on Jan. 29, 2014, provisional application No. 61/944,581, filed on Feb. 26, 2014, provisional application No. 62/015,507, filed on Jun. 22, 2014, provisional application No. 62/039,878, filed on Aug. 20, 2014.

(56) References Cited

OTHER PUBLICATIONS

LG Electronics Inc., "Management of UE Transmit Power in Dual Connectivity," 3GPP TSG-RAN WG2 Meeting #84, R2-134048, San Francisco, USA, Nov. 11-15, 2013, pp. 1-2.
Panasonic et al., "Uplink transmission power management and PHR reporting for dual connectivity," 3GPP TSG RAN WG2 Meeting #84, R2-133945, San Francisco, USA, Nov. 11-15, 2013, pp. 1-3.
Pantech, "Challenge on UL transmission of dual connectivity," 3GPP TSG-RAN WG2 Meeting #83, R2-132504, Barcelona, Spain, Aug. 19-23, 2013, pp. 1-8.

* cited by examiner

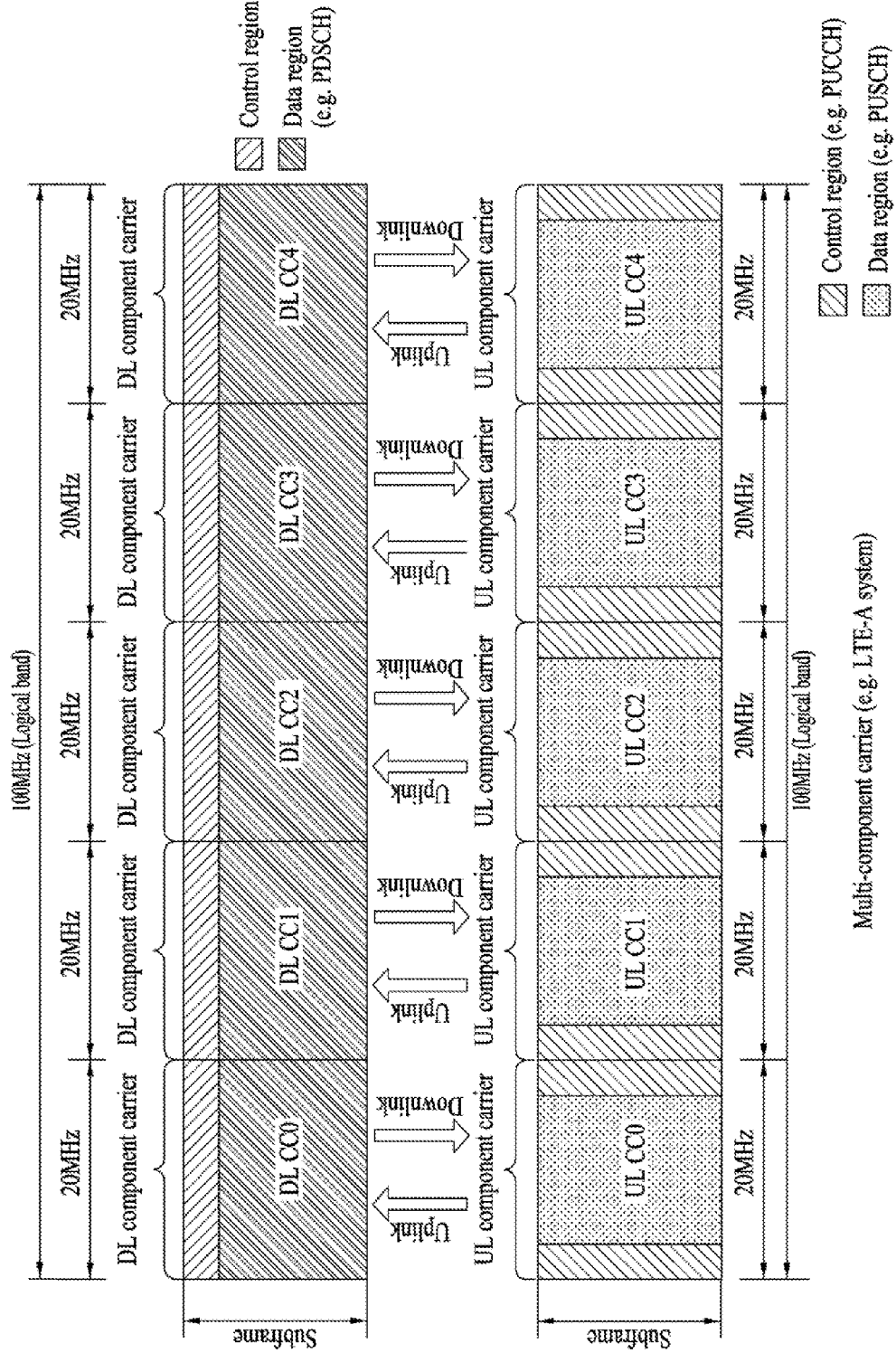

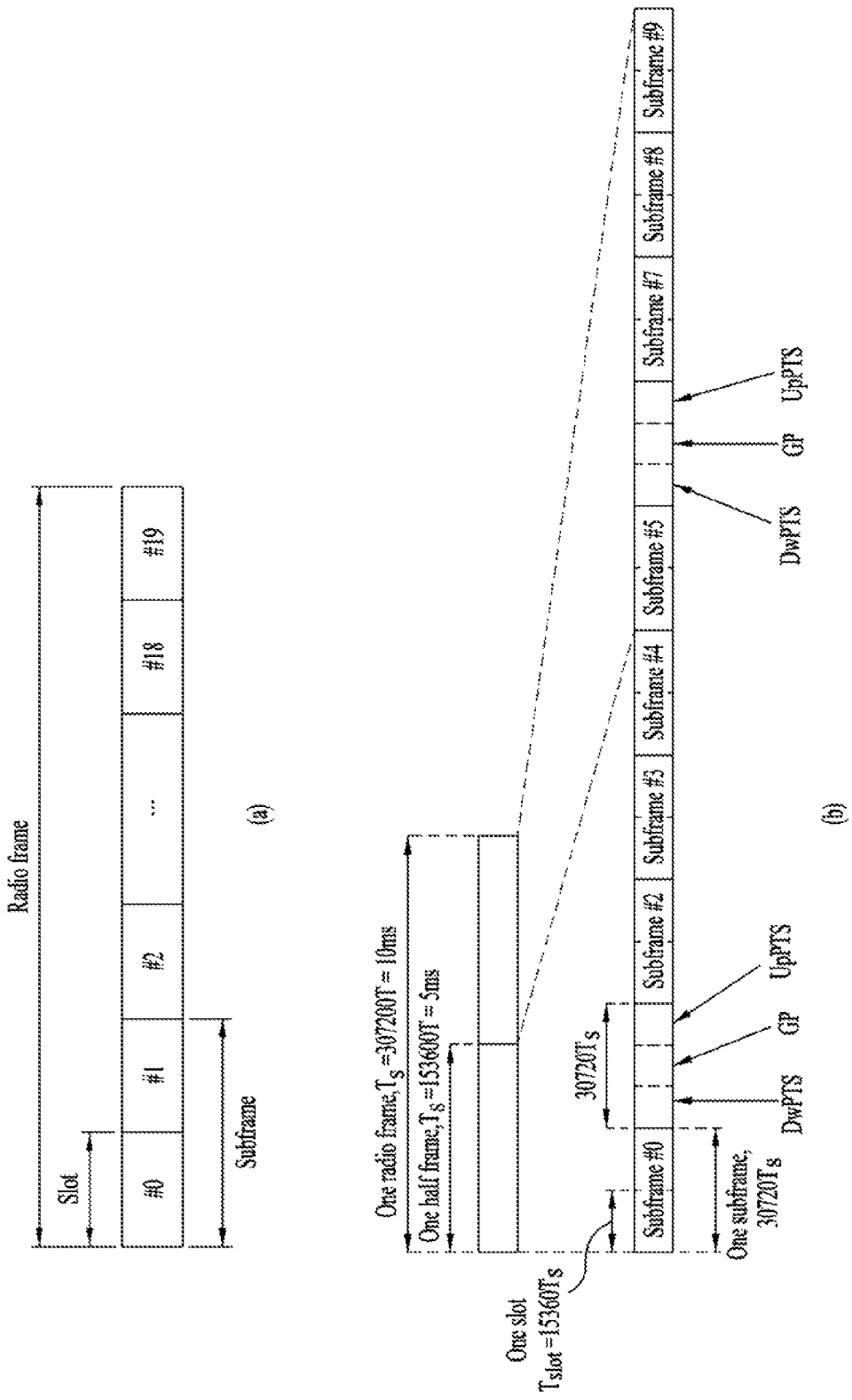

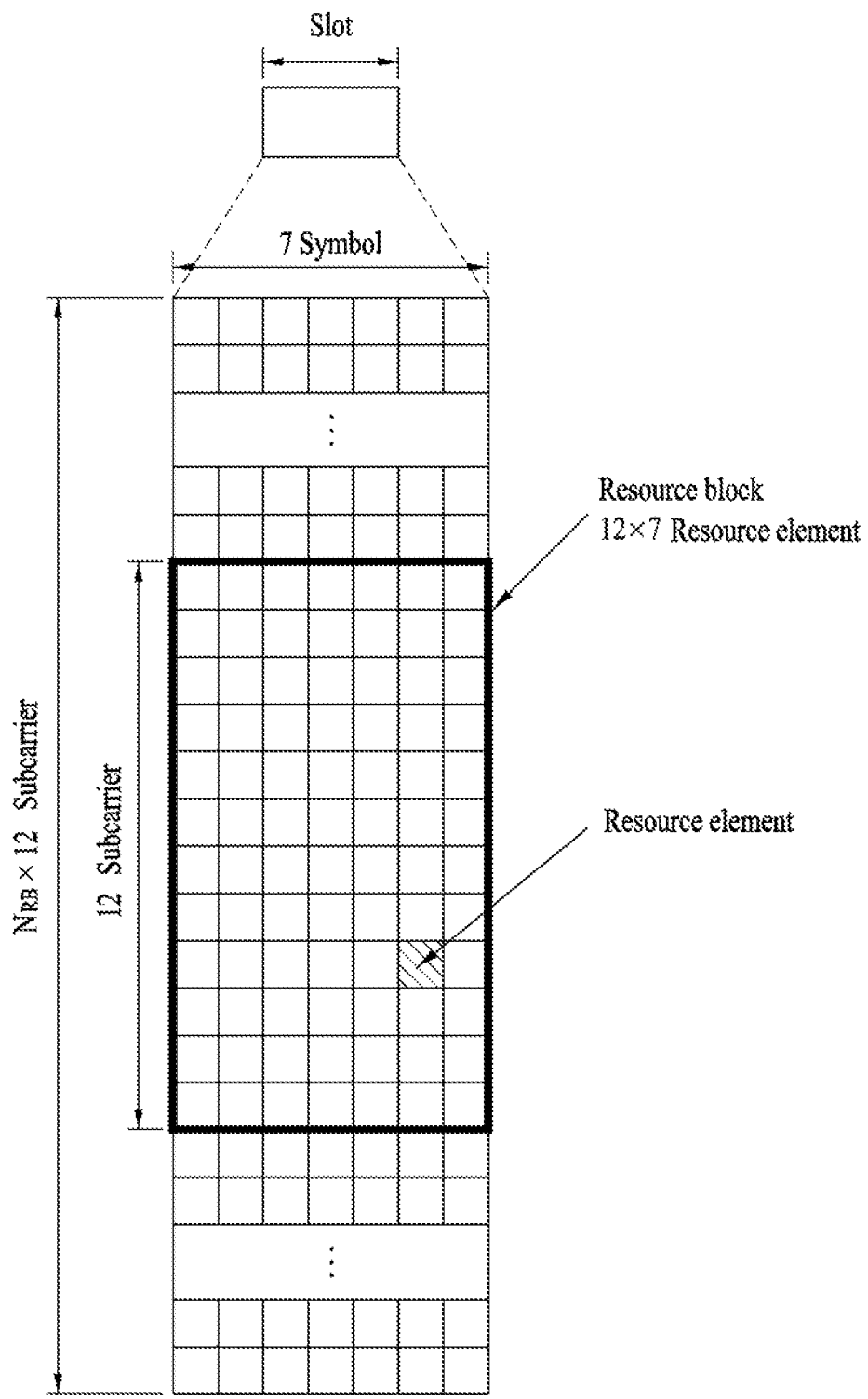

PUCCH format 1a and 1b structure (normal CP case)

| C7 | C6 | C5 | C4 | C3 | C2 | C1 | R |
|---|---|---|---|---|---|---|---|
| P | V | \multicolumn{6}{c}{PH (Type 2, PCell)} |
| R | R | \multicolumn{6}{c}{$P_{CMAX,c}$ 1} |
| P | V | \multicolumn{6}{c}{PH (Type 1, PCell)} |
| R | R | \multicolumn{6}{c}{$P_{CMAX,c}$ 2} |
| P | V | \multicolumn{6}{c}{PH (Type 1, SCell 1)} |
| R | R | \multicolumn{6}{c}{$P_{CMAX,c}$ 3} |

...

| P | V | PH (Type 1, SCell n) |
|---|---|---|
| R | R | $P_{CMAX,c}$ m |

* In the case of simultaneous UL transmission in PCell (group) and SCell (group) and maximum power limitation, UL transmission of PCell (group) and/or SCell (group) can be controlled in power or can be dropped.

METHOD AND DEVICE FOR TRANSMITTING UPLINK SIGNAL IN WIRELESS COMMUNICATION SYSTEM

CROSS REFERENCE TO RELATED APPLICATIONS

This application is the National Phase of PCT International Application No. PCT/KR2015/000673, filed on Jan. 22, 2015, which claims priority under 35 U.S.C. 119(e) to U.S. Provisional Application No. 61/930,441, filed on Jan. 22, 2014, 61/933,286, filed on Jan. 29, 2014, 61/944,581, filed on Feb. 26, 2014, 62/015,507, filed on Jun. 22, 2014, and 62/039,878, filed on Aug. 20, 2014, all of which are hereby expressly incorporated by reference into the present application.

TECHNICAL FIELD

The present invention relates to a wireless communication system, and more particularly, to a method of transmitting an uplink signal in a CA (carrier aggregation)-based wireless communication system and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Task

An object of the present invention is to provide a method of efficiently transmitting and receiving an uplink signal in a CA-based wireless communication system and an apparatus therefor. Specifically, an object of the present invention is to provide a method of efficiently transmitting and receiving an uplink signal in an inter-site carrier aggregation and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of controlling uplink power, which is controlled by a user equipment in a wireless communication system, includes the steps of adjusting transmit power of at least one or more cells belonging to a first cell group to make transmit power of the first cell group not exceed maximum power limit set to the first cell group, adjusting transmit power of at least one or more cells belonging to a second cell group to make transmit power of the second cell group not exceed maximum power limit set to the second cell group, if total transmit power of all cell groups including the first cell group and the second cell group exceeds maximum power limit set to the user equipment, additionally reducing the transmit power of the first cell group and the transmit power of the second cell group, and performing uplink transmission in the first cell group and the second cell group using the additionally reduced transmit power.

To further achieve these and other advantages and in accordance with the purpose of the present invention, according to a different embodiment, a user equipment configured to control uplink power in a wireless communication system includes an RF (radio frequency) unit and a processor, the processor configured to adjust transmit power of at least one or more cells belonging to a first cell group to make transmit power of the first cell group not exceed maximum power limit set to the first cell group, the processor configured to adjust transmit power of at least one or more cells belonging to a second cell group to make transmit power of the second cell group not exceed maximum power limit set to the second cell group, the processor, if total transmit power of all cell groups including the first cell group and the second cell group exceeds maximum power limit set to the user equipment, configured to additionally reduce the transmit power of the first cell group and the transmit power of the second cell group, the processor configured to perform uplink transmission in the first cell group and the second cell group using the additionally reduced transmit power.

Preferably, the transmit power of the first cell group and the transmit power of the second cell group can be reduced using a scaling factor per cell group.

Preferably, the scaling factor per cell group can be configured in proportion to the number of cells belonging to each cell group.

Preferably, the scaling factor per cell group can be configured in proportion to the number of activated cells among a plurality of cells constructing each cell group.

Preferably, the transmit power of the first cell group is additionally reduced so as to be equal to or less than a value described in the following: $(P_{cg-1}/P_{cg-sum}) \times P_{ue-max}$. In this case, $P_{cg-1}$ corresponds to the transmit power of the first cell group, $P_{cg-sum}$ corresponds to the total transmit power of all cell groups, and $P_{ue-max}$ corresponds to the maximum power limit set to the user equipment.

Preferably, at least one of the first cell group and the second cell group can include a plurality of cells.

Advantageous Effects

According to the present invention, it is able to efficiently transmit and receive an uplink signal in a CA-based wireless communication system. Specifically, it is able to efficiently transmit and receive an uplink signal in an inter-site CA.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 1A and 1B illustrate a carrier aggregation (CA)-based wireless communication system.

FIG. 2 illustrates the structure of a radio frame.

FIG. 3 illustrates a resource grid of a downlink (DL) slot.

BEST MODE

Mode for Invention

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA and employs OFDMA in downlink and SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. And, specific terminologies used in the following description are provided to help the present invention to be understood. The specific terminologies can be modified into a different form within a range not deviating from a technical idea of the present invention.

Figure 1A:
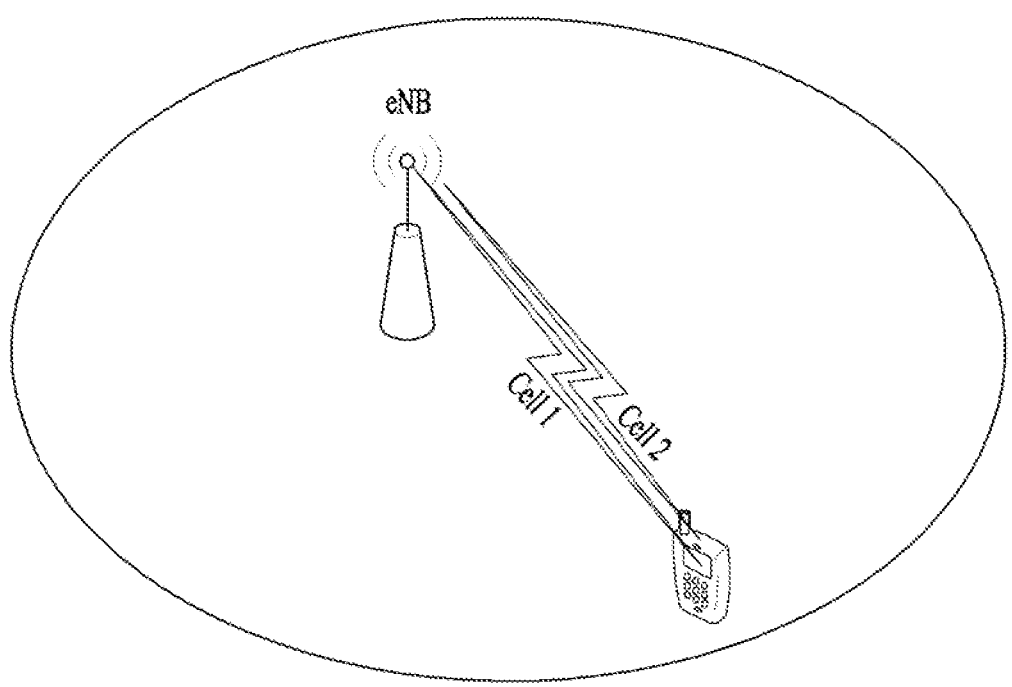

FIGS. 1A and 1B illustrate a conventional carrier aggregation (CA)-based wireless communication system. LTE supports only one DL/UL frequency block, whereas LTE-A provides a wider frequency band by aggregating a plurality of UL/DL frequency blocks. Each frequency block is transmitted using a component carrier (CC). A CC refers to a carrier frequency (or center carrier or center frequency) of a frequency block.

Referring to FIGS. 1A and 1B, a plurality of DL/UL CCs managed by one eNB can be aggregated for one UE. CCs may be contiguous or non-contiguous. The bandwidth of each CC can be independently determined. Asymmetrical carrier aggregation in which the number of UL CCs differs from the number of DL CCs is possible. Even when the entire system bandwidth corresponds to N CCs, a frequency band that can be used by a specific UE can be limited to L (<N) CCs. Various parameters with respect to carrier aggregation can be set cell-specifically, UE group-specifically or UE-specifically. Control information can be set such that the control information is transmitted and received only through a specific CC. Such specific CC may be referred to as a primary CC (PCC) (or anchor CC) and the remaining CCs may be referred to as secondary CCs (SCCs). Since UCI is transmitted only on the PCC, a plurality of PUCCHs is not transmitted through a plurality of UL CCs and transmission of a plurality of PUCCHs on the PCC is not permitted for UE power management. Accordingly, only one PUCCH can be transmitted in one UL subframe in a conventional CA system.

LTE(-A) uses the concept of the cell for radio resource management. The cell is defined as a combination of DL resources and UL resources. The UL resources are not mandatory. Accordingly, the cell can be composed of DL resources only or DL resources and UL resources. When carrier aggregation is supported, linkage between a carrier frequency of a DL resource (or DL CC) and a carrier frequency of a UL resource (or UL CC) can be indicated by system information. A cell operating at a primary frequency (or on a PCC) may be referred to as a primary cell (PCell) and a cell operating at a secondary frequency (or on an SCC) may be referred to as a secondary cell (SCell). The PCell is used to perform initial radio resource control connection establishment or RRC connection re-configuration. The PCell may refer to a cell indicated during a handover procedure. The SCell can be configured after RRC (Radio Resource Control) connection can be established between an eNB and a UE and used to provide additional radio resources. The PCell and the SCell may be commonly called a serving cell.

Unless separately mentioned, the following description may be applied to each of a plurality of aggregated CCs (or cells). In addition, a CC in the following description may be replaced with a serving CC, serving carrier, cell, serving cell, etc.

FIG. 2 illustrates the structure of a radio frame.

FIG. 2(*a*) illustrates the structure of a type-1 radio frame for frequency division duplex (FDD). A radio frame includes a plurality of (e.g., 10) subframes, and each subframe includes a plurality of (e.g., 2) slots in the time domain. Each subframe may have a length of 1 ms and each slot may have a length of 0.5 ms. A slot includes a plurality of OFDM/SC-FDMA symbols in the time domain and includes a plurality of resource blocks (RBs) in the frequency domain.

FIG. 2(*b*) illustrates the structure of a type-2 radio frame for time division duplex (TDD). The type-2 radio frame includes 2 half frames, and each half frame includes 5 subframes. One subframe includes 2 slots.

Table 1 shows uplink-downlink configurations (UL-DL Cfgs) of subframes in a radio frame in a TDD mode. UD-cfg is signaled through system information (e.g., a system information block (SIB)). For convenience, UD-cfg, which is set through the SIB for a TDD cell, is referred to as SIB-cfg.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes a downlink pilot time slot (DwPTS), a guard period (GP), and an uplink pilot time slot (UpPTS). The DwPTS is a time period reserved for downlink transmission and the UpPTS is a time period reserved for uplink transmission.

FIG. 3 illustrates a resource grid of a DL slot.

Referring to FIG. 3, a DL slot includes a plurality of OFDMA (or OFDM) symbols in the time domain. One DL slot may include 7(6) OFDMA symbols, and one resource block (RB) may include 12 subcarriers in the frequency domain. Each element on the resource grid is referred to as a resource element (RE). One RB includes 12×7(6) REs. The number $N^{RB}$ of RBs included in the DL slot depends on a downlink transmit bandwidth. The structure of a UL slot may be same as that of the DL slot except that OFDMA symbols are replaced by SC-FDMA symbols.

Figure 4:
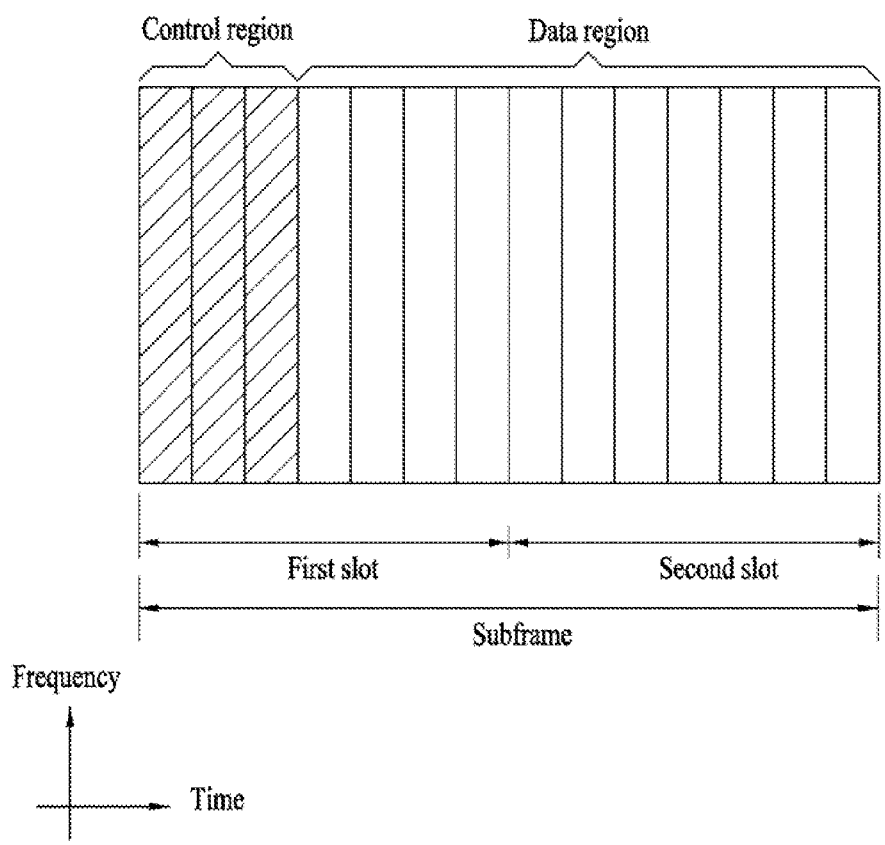
FIG. 4 illustrates the structure of a DL subframe.

FIG. 4 illustrates the structure of a DL subframe.

Referring to FIG. 4, up to 3(4) OFDMA symbols located in a front portion of a first slot within a subframe correspond to a control region to which a control channel is allocated. The remaining OFDMA symbols correspond to a data region to which a physical downlink shared chancel (PDSCH) is allocated. Examples of downlink control channels include a physical control format indicator channel (PCFICH), a physical downlink control channel (PDCCH), a physical HARQ indicator channel (PHICH), etc. The PCFICH is transmitted at a first OFDM symbol of a subframe and carries information regarding the number of OFDMA symbols used for transmission of control channels within the subframe. The PHICH is a response to uplink transmission and carries a HARQ acknowledgement (ACK)/negative acknowledgement (NACK) signal.

A PDCCH may carry a transmission format and resource allocation information of a downlink shared channel (DL-SCH), a transmission format and resource allocation information of an uplink shared channel (UL-SCH), paging information on a paging channel (PCH), system information on the DL-SCH, resource allocation information of an upper-layer control message such as a random access response transmitted on the PDSCH, a set of Tx power control commands on individual UEs within an arbitrary UE group, a Tx power control command, information on activation of a voice over IP (VoIP), etc.

Downlink control information (DCI) is transmitted on a PDCCH. DCI formats 0/4 (hereinafter referred to as UL DCI formats) are defined for UL scheduling (or UL grant), and DCI format 1/1A/1B/1C/1D/2/2A/2B/2C (hereinafter referred to as DL DCI format) is defined for DL scheduling. The DCI format selectively includes information such as a hopping flag, RB allocation information, modulation and coding scheme (MCS), redundancy version (RV), new data indicator (NDI), transmit power control (TPC), demodulation reference signal (DMRS) cyclic shift, depending on its use. In addition, DCI format 3/3A (referred to as TPC DCI format hereinafter) is defined for uplink signal power control. The TPC DCI format includes bitmap information for a plurality of UEs, and 2-bit information (DCI format 3) or 1-bit information (DCI format 3A) in the bitmap indicates a TPC command for a PUCCH and a PUSCH of a corresponding UE.

A plurality of PDCCHs may be transmitted within a control region. A UE may monitor the PDCCHs in every subframe to check a PDCCH designated to the UE. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A PDCCH coding rate may be controlled according to the number of CCEs (i.e., CCE aggregation level) used for PDCCH transmission. The CCE includes a plurality of resource element groups (REGs). A format of the PDCCH and the number of PDCCH bits are determined according to the number of CCEs. A BS determines a PDCCH format according to DCI to be transmitted to the UE, and attaches a cyclic redundancy check (CRC) to control information. The CRC is masked with an identifier (e.g., radio network temporary identifier (RNTI)) according to an owner or usage of the PDCCH. If the PDCCH is for a specific UE, an identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
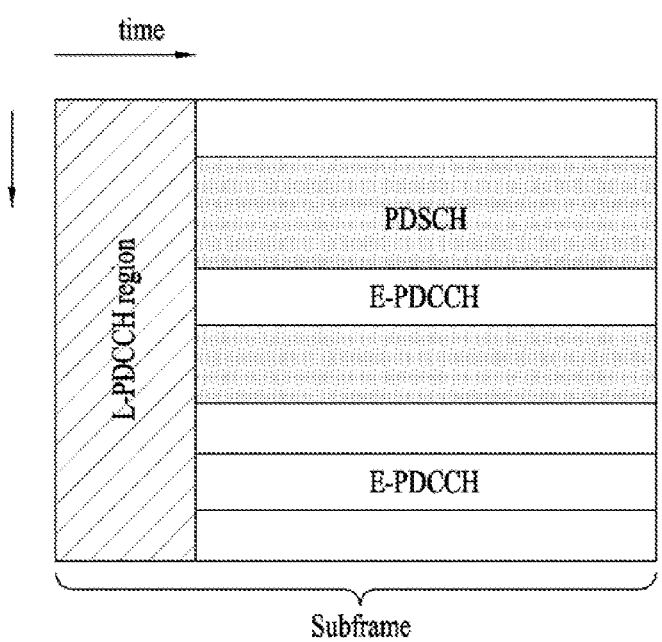
FIG. 5 illustrates an example of Enhanced Physical Downlink Control Channel (EPDCCH).

FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE/LTE-A may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type.

Then, a description is now given of scheduling when a plurality of CCs (or cells) are configured. If a plurality of CCs are configured, cross-carrier scheduling scheme and non-cross-carrier scheduling (or self scheduling) scheme may be used. The non-cross-carrier scheduling (or self scheduling) scheme is the same as the legacy LTE scheduling scheme.

If cross-carrier scheduling is configured, a DL grant PDCCH may be transmitted in DL CC#0, and a corresponding PDSCH may be transmitted in DL CC#2. Likewise, a UL grant PDCCH may be transmitted in DL CC#0, and a corresponding physical uplink shared channel (PUSCH) may be transmitted in UL CC#4. For cross-carrier scheduling, a carrier indicator field (CIF) is used. Whether a CIF is present in a PDCCH may be determined through higher layer signaling (e.g., RRC signaling) using semi-static and UE-specific (or UE-group-specific) schemes.

Scheduling according to whether a CIF is set may be defined as described below.

CIF disabled: A PDCCH in a DL CC allocates PDSCH resources in the same DL CC or allocates PUSCH resources in one linked UL CC CIF enabled: A PDCCH in a DL CC may allocate PDSCH or PUSCH resources in a specific DL/UL CC among a plurality of aggregated DL/UL CCs, using a CIF When a CIF is present, a BS may allocate one or more PDCCH monitoring DL CCs (hereinafter referred to as monitoring CCs (MCCs)) to a UE. The UE may detect/decode a PDCCH in the MCCs. That is, if the BS schedules a PDSCH/PUSCH to the UE, a PDCCH is transmitted only in the MCCs. The MCCs may be set using UE-specific, UE-group-specific, or cell-specific scheme. The MCCs include a PCC.

Figure 6:
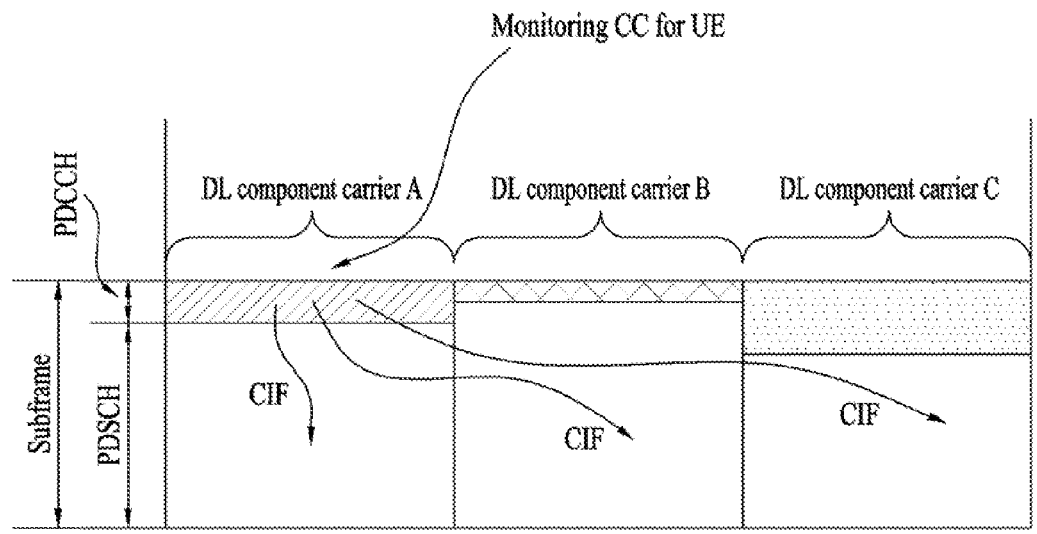
FIG. 6 illustrates a scheduling method when a plurality of cells is configured.

FIG. 6 illustrates cross-carrier scheduling. Although DL scheduling is illustrated in FIG. 6, the illustrated scheme is equally applied to UL scheduling.

Referring to FIG. 6, 3 DL CCs may be configured for a UE, and DL CC A may be set as a PDCCH monitoring DL CC (i.e., MCC). If a CIF is disabled, each DL CC may transmit a PDCCH for scheduling its PDSCH without the CIF according to the LTE PDCCH rules. On the other hand, if a CIF is enabled, DL CC A (i.e., MCC) may transmit not only a PDCCH for scheduling its PDSCH but also PDCCHs for scheduling PDSCHs of other CCs, using the CIF. In this example, DL CC B/C transmits no PDCCH.

Figure 7:
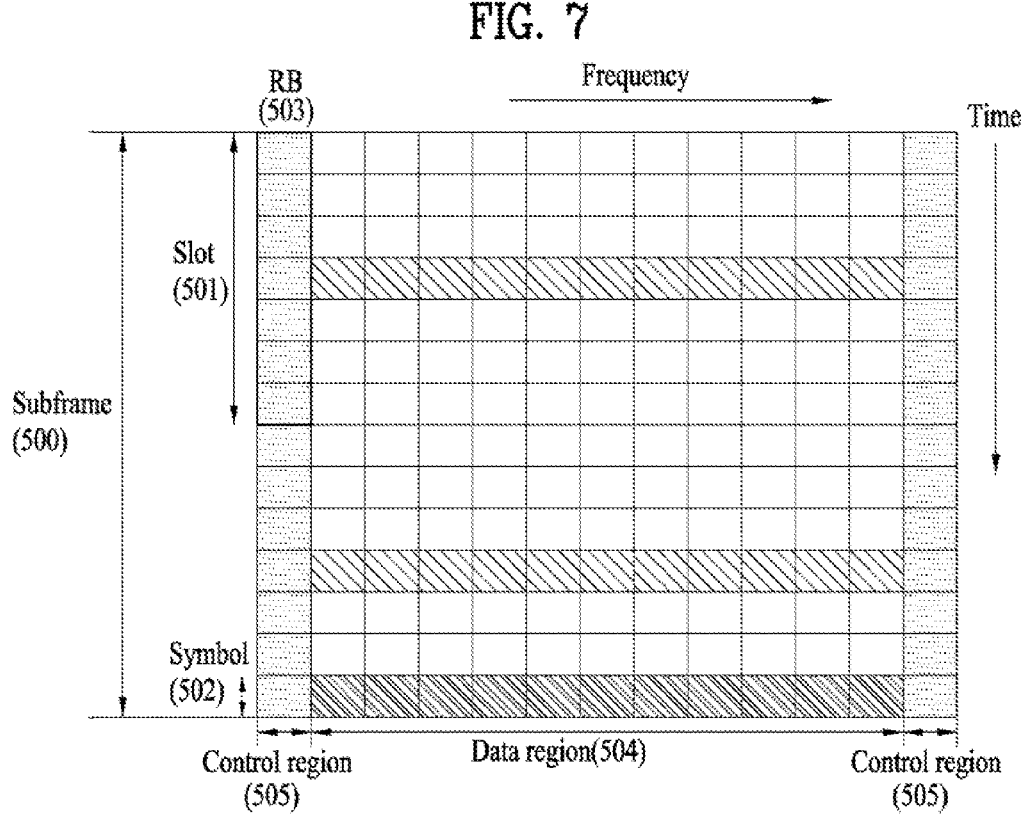
FIG. 7 illustrates the structure of an uplink subframe.

FIG. 7 is a diagram showing the structure of an uplink subframe.

Referring to FIG. 7, a subframe having a length of 1 ms includes two of slots each having a length of 0.5 ms. The slot may include SC-FDMA symbols, the number of which is changed according to CP length. For example, the slot includes seven SC-FDMA symbols in a normal CP case and includes six SC-FDMA symbols in an extended CP case. A resource block 503 is a resource allocation unit corresponding to 12 subcarriers in a frequency domain and one slot in a time domain. The structure of the uplink subframe may be divided into a control region 504 and a data region 505. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary. An SRS (Sounding Reference Signal) is transmitted on the last SC-FDMA symbol of the subframe. The SRS may be transmitted periodically or aperiodically at the request of an eNB. Periodic SRS transmission is defined by a cell-specific parameter and a UE-specific parameter. The cell-specific parameter indicates all subframe sets (referred to as cell-specific SRS subframe sets hereinafter) in which the SRS can be transmitted in a cell and the UE-specific parameter indicates a subframe sub-set (referred to as a UE-specific SRS subframe set hereinafter) that is actually allocated to a UE within all subframe sets.

The PUCCH can be used to transmit the following control information.

SR (Scheduling Request): This is information used to request UL-SCH resources and is transmitted using on-off keying (OOK) scheme.

HARQ-ACK: This is a response signal to a downlink signal (e.g., PDSCH, SPS release PDCCH). For example, 1-bit ACK/NACK is transmitted as a response to one DL codeword and 2-bit ACK/NACK is transmitted as a response to two DL codewords.

CSI (Channel Status Information): This is feedback information on a DL channel and includes channel quality information (CQI), rank indicator (RI), precoding matrix indicator (PMI), precoding type indicator (PTI), etc. Here, the CSI refers to periodic CSI (p-CSI). Aperiodic CSI (aperiodic CSI (a-CSI)) transmitted at the request of an eNB is transmitted on a PUSCH.

Table 2 shows the mapping relationship between a PUCCH format (PF) and UCI in LTE(-A).

TABLE 2

| PUCCH format | Uplink Control Information (UCI) |
| --- | --- |
| Format 1 | SR (scheduling request) (unmodulated waveform) |
| Format 1a | 1-bit HARQ-ACK/NACK (with/without SR) |
| Format 1b | 2-bit HARQ-ACK/NACK (with/without SR) |
| Format 2 | CSI (20 coded bits) |
| Format 2 | CSI and 1-bit or 2-bit HARQ-ACK/NACK (20 bits) (for extended CP only) |
| Format 2a | CSI and 1-bit HARQ-ACK/NACK (20 + 1 coded bits) |
| Format 2b | CSI and 2-bit HARQ-ACK/NACK (20 + 2 coded bits) |
| Format 3 (LTE-A) | Up to 24 bits of HARQ-ACK/NACK + SR |

Figure 8:
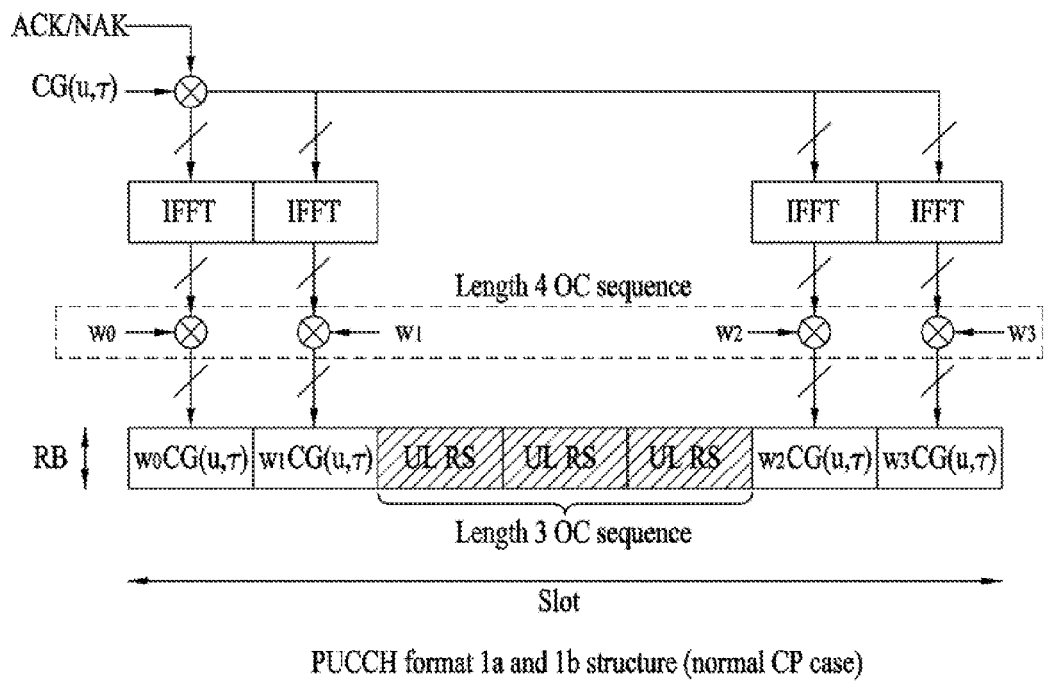
FIG. 8 illustrates the structures of physical uplink control channel (PUCCH) formats 1a and 1b in a slot level.

FIG. 8 illustrates the structures of PUCCH formats 1a and 1b in a slot level. In PUCCH formats 1a and 1b, the same control information is repeated on a slot basis in a subframe. Each UE transmits an ACK/NACK signal in different resources configured by a different cyclic shift (CS) (frequency-domain code) and a different orthogonal cover code (OCC) (time-domain spreading code) of a computer-generated constant amplitude zero auto correlation (CG-CAZAC) sequence. An OCC includes a Walsh/DFT orthogonal code. If the number of CSs is 6 and the number of OCs is 3, ACK/NACK signals of 18 UEs may be multiplexed into the same physical resource block (PRB). In PUCCH format 1, ACK/NACK in PUCCH format 1a/1 is replaced by an SR.

Figure 9:
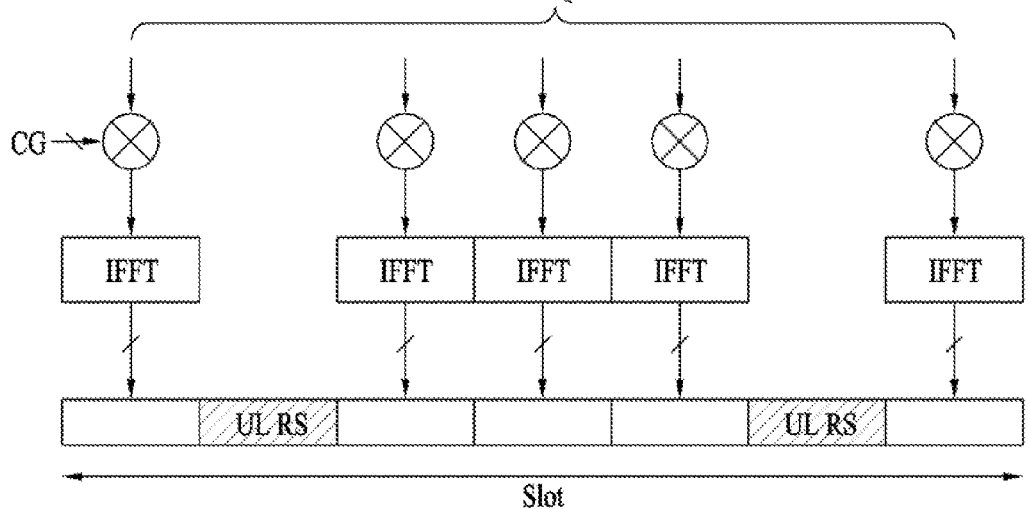
FIG. 9 is a diagram showing a slot level structure of PUCCH format 2.

FIG. 9 is a diagram showing PUCCH format 2.

Referring to FIG. 9, if a normal CP is configured, PUCCH format 2/2a/2b includes five QPSK data symbols and two RS symbols at a slot level. If an extended CP is configured, PUCCH format 2/2a/2b includes five QPSK data symbols and one RS symbol at a slot level. If an extended CP is configured, an RS symbol is located at a fourth SC-FDMA symbol of each slot. Accordingly, PUCCH format 2/2a/2b may carry a total of 10 QPSK data symbols. Each QPSK symbol is spread in the frequency domain by a CS and then is mapped to an SC-FDMA symbol. The RS may be multiplexed by code division multiplexing (CDM) using a CS. A/N transmission and CSI transmission may be required in the same subframe. In this case, when a higher layer sets non-permission of A/N+CSI simultaneous transmission ("Simultaneous-A/N-and-CQI" parameter=OFF), only A/N transmission is performed using PUCCH format 1a/1b and CSI transmission is dropped. Conversely, when permission of A/N+CQI simultaneous transmission is set ("Simultaneous-AN-and-CQI" parameter=ON), A/N and CSI are transmitted together through PUCCH format 2/2a/2b. Specifically, in the case of normal CP, A/N is embedded in the second RS of each slot (e.g., A/N is multiplied by the RS) in PUCCH format 2a/2b. In the case of an extended CP, A/N and CSI are joint-coded and then transmitted through PUCCH format 2.

Figure 10:
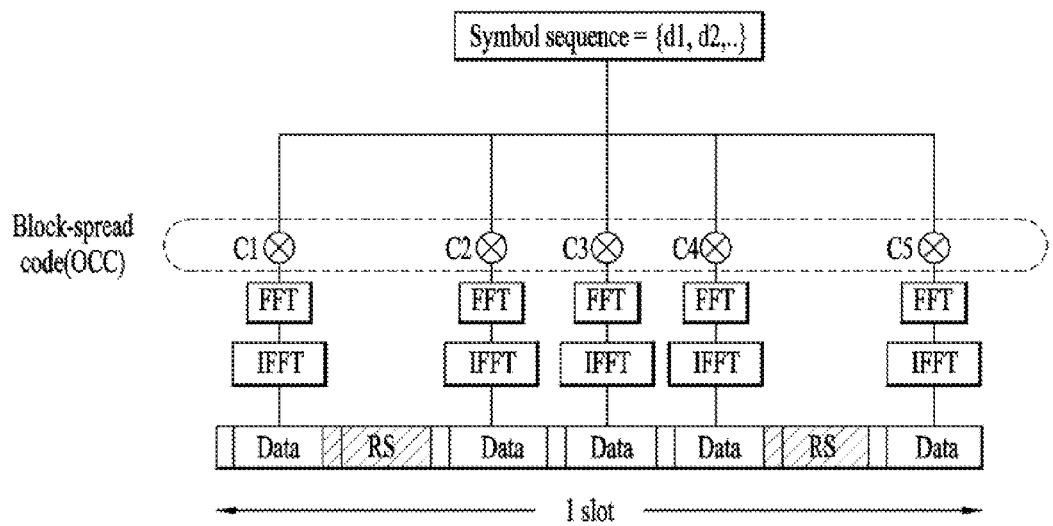
FIG. 10 illustrates the structure of PUCCH format 3 in a slot level.

FIG. 10 illustrates the structure of PUCCH format 3 in a slot level. PUCCH format 3 is used to transmit a plurality of ACK/NACK information, and information such as CSI and/or SR may be transmitted together.

Referring to FIG. 10, one symbol sequence is transmitted over the frequency domain, and OCC-based time-domain spreading is applied to the symbol sequence. Control signals of a plurality of UEs may be multiplexed into the same RB using OCCs. Specifically, 5 SC-FDMA symbols (i.e. a UCI data part) are generated from one symbol sequence {d1, d2, . . . } using a length-5 OCC. Here, the symbol sequence {d1, d2, . . . } may be a modulation symbol sequence or a codeword bit sequence. The symbol sequence {d1, d2, . . . } may be generated by performing joint coding (e.g., Reed-Muller coding, tail-biting convolutional coding, etc.), block-spreading, and SC-FDMA modulation on a plurality of pieces of ACK/NACK information.

Figure 11:
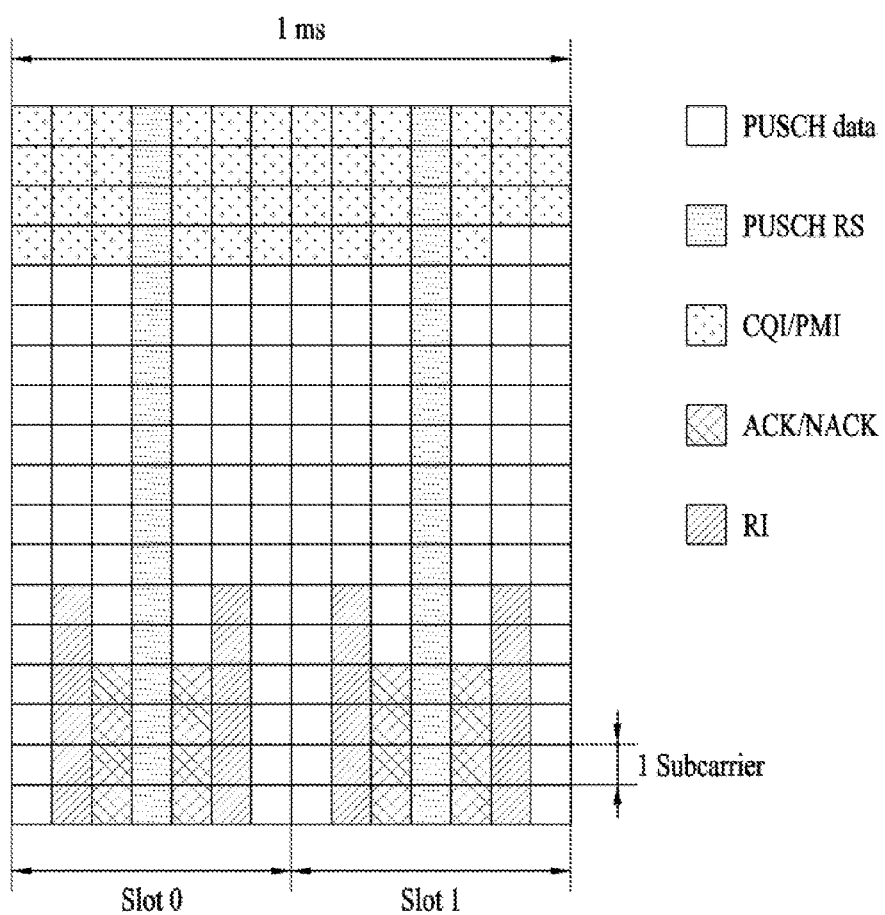
FIG. 11 illustrates a method for transmitting uplink control information (UCI) on a physical uplink shared channel (PUSCH).

FIG. 11 illustrates a method for transmitting UCI on a PUSCH. A subframe which requires UCI transmission has PUSCH assignment, UCI may be transmitted on a PUSCH (PUSCH piggyback). Specifically, for piggybacking of CSI/PMI and RI, PUSCH data (i.e., UL-SCH data) information (e.g., a coded symbol) is rate-matched in consideration of the quantity of the CSI/PMI and RI. Meanwhile, ACK/NACK is inserted into part of SC-FMDA resources to which the UL-SCH data is mapped through puncturing. UCI can be scheduled to be transmitted on a PUSCH without the UL-SCH data.

When a UE needs to transmit a PUCCH in a cell-specific SRS subframe set, the UE does not use the last SC-FDMA symbol of the second slot to transmit the PUCCH in order to protect the SRS thereof/SRSs of other UEs. For convenience, a PUCCH format in which all SC-FDMA symbols of a subframe are used for PUCCH transmission is referred to as a normal PUCCH format and a PUCCH format in which the last SC-FDMA symbol of the second slot is not used for PUCCH transmission is referred to as a shortened PUCCH format. For the same reason, when a PUSCH is allocated to a cell-specific SRS subframe, each UE does not use the last SC-FDMA symbol of the second slot for PUSCH transmission. Specifically, PUSCH data (i.e. UL-SCH data) information (e.g., coded symbol) is rate-matched in consideration of the quantity of a resource of the last SC-FDMA symbol. For convenience, a PUSCH, which is transmitted using all SC-FDMA symbols of a subframe, is referred to as a normal PUSCH and a PUSCH, which is transmitted without using the last SC-FDMA symbol of the second slot, is referred to as a rate-matched PUSCH.

Figure 12:
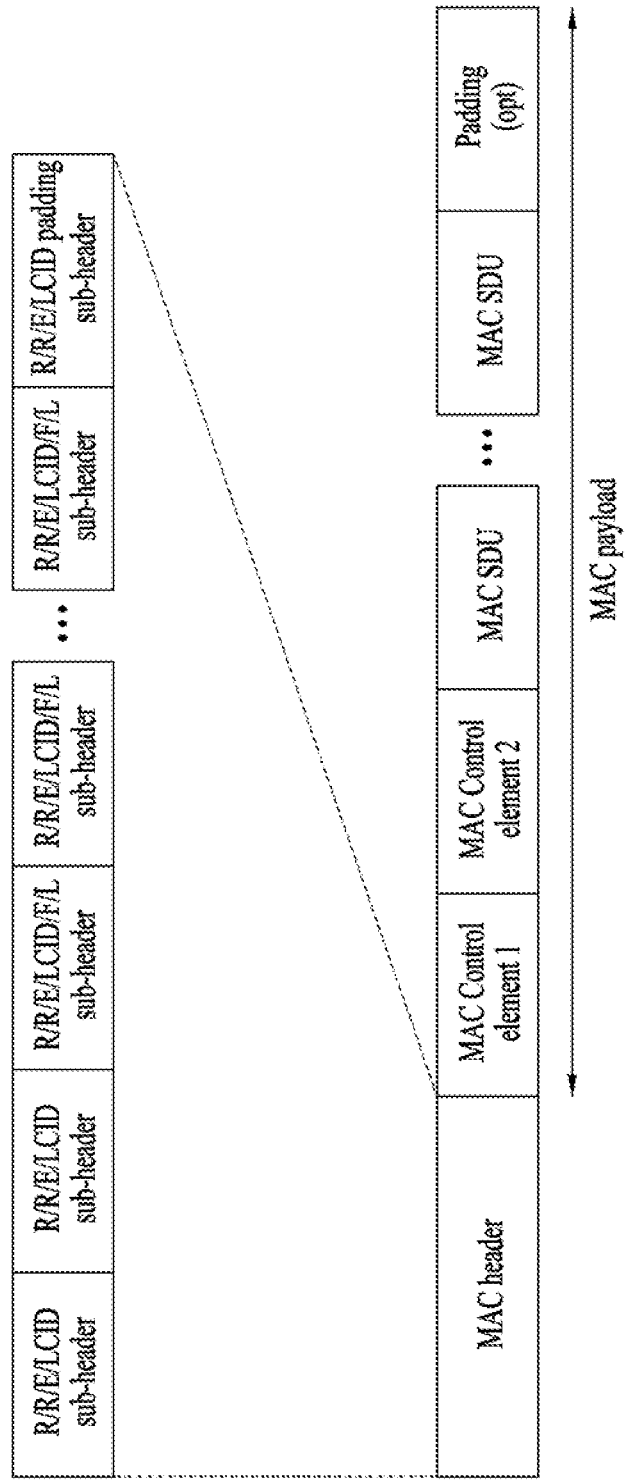
FIG. 12 is a diagram showing a medium access control protocol data unit (MAC PDU).

FIG. 12 is a diagram showing a medium access control protocol data unit (MAC PDU). The MAC PDU is transmitted via a downlink shared channel (DL-SCH) and an uplink shared channel (UL-SCH).

Referring to FIG. 12, the MAC PDU includes a MAC header, 0 or more MAC service data units (SDUs) and 0 or more MAC control elements (CEs). A MAC PDU subheader has the same order as the MAC SDU and MAC CE corresponding thereto. The MAC CE is located in front of the MAC SDU. The MAC CE is used to carry a variety of MAC control information. For example, the MAC CE includes SCell activation/deactivation information, TAC information, buffer status report (BSR) information and power headroom report (PHR) information.

Figures 13, 14:
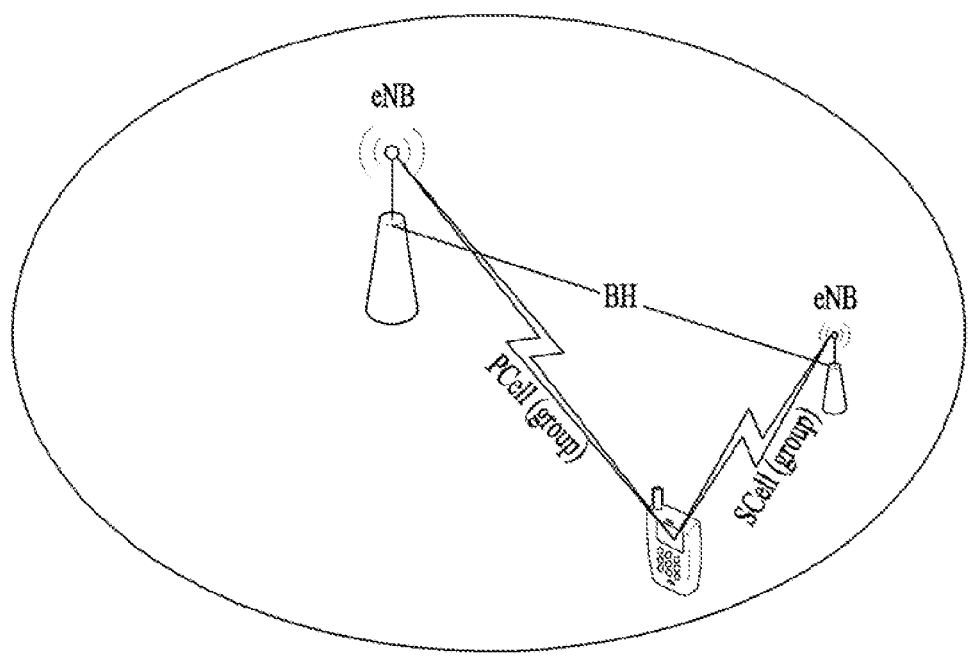
FIG. 13 is a diagram showing a power headroom report (PHR) MAC CE.
FIG. 14 is a diagram showing inter-site carrier aggregation (CA).

FIG. 13 is a diagram showing a power headroom report (PHR) MAC CE. FIG. 13 shows an extended PH MAC CE and may notify the UE of a PH for aggregated all cells. The field of the PH MAC CE will now be described.

$C_i$: Indicates whether a PH field for an SCell having ScellIndex i is present. The $C_i$ field is set to 1 if the PH field for the SCell having ScellIndex i is reported and, otherwise, is set to 0.

R: Reserved bit. This is set to 0.

V: Indicates whether the PH value is based on actual transmission or reference format.

PH: Indicates a power headroom level.

P: Indicates whether the UE applies power backoff for power management.

$P_{CMAC,c}$: Indicates information about per-cell maximum power used to calculate the value of the above-described PH field.

Embodiment: Power Adjustment in Inter-Site CA

In LTE-A, assume that aggregation (that is, CA) of a plurality of cells is supported and a plurality of cells aggregated for one UE is managed by one eNB (intra-site CA) (see, FIG. 1). In intra-site CA, since all cells are managed by one eNB, signaling related to various RRC configurations/reports and MAC commands/messages may be performed via any one of all aggregated cells. For example, signaling involved in a procedure of adding or releasing a specific SCell to or from a CA cell set, a procedure of changing a transmission mode (TM) of a specific cell, a procedure of performing radio resource management (RRM) measurement reporting associated with a specific cell, etc. may be performed via any cell of the CA cell set. As another example, signaling involved in a procedure of activating/deactivating a specific SCell, a buffer status report for UL buffer management, etc. may be performed via any cell of the CA cell set. As another example, a per-cell power headroom report (PHR) for UL power control, a per-timing advanced group (TAG) timing advance command (TAC) for UL synchronization control, etc. may be signaled via any cell of the CA cell set.

Meanwhile, in a next-generation system subsequent to LTE-A, a plurality of cells (e.g., micro cells) having small coverage may be deployed in a cell (e.g., a macro cell) having large coverage, for traffic optimization. For example, a macro cell and a micro cell may be aggregated for one UE, the macro cell may be mainly used for mobility management (e.g., PCell) and the micro cell may be mainly used for throughput boosting (e.g., SCell). In this case, the cells aggregated for one UE may have different coverages and may be respectively managed by different eNBs (or nodes (e.g., relays) corresponding thereto) which are geographically separated from each other (inter-site CA).

FIG. 14 is a diagram showing inter-site carrier aggregation (CA). Referring to FIG. 14, a method for performing radio resource control and management for a UE (e.g., all functions of RRC and some functions of MAC) at an eNB for managing a PCell (e.g., CC1) and performing data scheduling and feedback with respect to each cell (that is, CC1 or CC2) (e.g., all functions of PHY and main functions of MAC) at each eNB for managing each cell may be considered. Accordingly, in inter-site CA, information/data exchange/delivery between cells (that is, between eNBs) is required. Upon considering a conventional signaling method, in inter-site CA, information/data exchange/delivery between cells (that is, between eNBs) may be performed via a backhaul (BH) link (e.g., a wired X2 interface or a wireless backhaul link). However, when the conventional method is applied without change, cell management stability, resource control efficiency and data transmission adaptation, etc. may be considerably reduced due to latency caused in an inter-eNB signaling procedure.

For example, as shown in FIG. 14, an inter-site CA situation in which a PCell (e.g., CC1) (group) and an SCell (e.g., CC2) (group) aggregated for one UE are respectively managed by eNB-1 and eNB-2 is assumed. In addition, assume that the eNB (that is, eNB-1) for managing the PCell is responsible for managing/performing an RRC function associated with the UE corresponding thereto. At this time, if a radio resource management (RRM) measurement (e.g., reference signal received power (RSRP), reference signal received quality (RSRQ)) report associated with the SCell is not transmitted by the PCell but is transmitted via the SCell (e.g., a PUSCH), eNB-2 may deliver the RRM measurement report to eNB-1 via the BH. In addition, based on the RRM report, for example, if eNB-1 sends an RRC reconfiguration command for releasing the SCell from the CA cell set to the UE via the PCell (e.g., a PDSCH), the UE may transmit a confirmation response to the RRC reconfiguration command via the SCell (e.g., a PUSCH) instead of the PCell. In this case, eNB-2 may deliver the confirmation response to eNB-1 via the BH, etc. Accordingly, in inter-site CA, considerable latency may be caused in an inter-cell (that is, inter-eNB) signaling procedure. Thus, misalignment between the eNB and the UE for CA cell set interpretation may occur and stable/efficient cell resource management and control may not be facilitated.

As another example, in the same inter-site CA situation, per-cell PHRs of all cells may be transmitted via the PCell (e.g., the PUSCH). In this case, eNB-1 (for managing the PCell) may deliver the PHR corresponding to all PHRs or a PHR corresponding to the SCell to eNB-2 (for managing the SCell) via the BH, etc. In contrast, if per-cell PHRs of all cells are transmitted via the SCell, eNB-2 may deliver all PHRs or a PHR corresponding to the PCell to eNB-1 via the BH, etc. Even at this time, stable/efficient UL power control and adaptive UL data scheduling/transmission based thereon may not be facilitated due to latency caused by inter-eNB signaling.

Accordingly, in inter-site CA, DL/UL data scheduling and UCI (e.g., ACK/NACK, CSI and SR) transmission may be performed per cell (group) belonging to the same eNB. For example, on the assumption that a PCell and an SCell, which are aggregated for one UE, respectively belong to eNB-1 and eNB-2, a DL/UL grant, which schedules DL/UL data transmitted through the PCell, and ACK/NACK feedback for the DL/UL data can be transmitted through the PCell, and a DL/UL grant, which schedules DL/UL data transmitted through the SCell, and ACK/NACK feedback for the DL/UL data can be transmitted through the SCell. In addition, aperiodic CSI (a-CSI)/periodic CSI (p-CSI) reports and SR signaling with respect to the PCell can be transmitted through the PCell, whereas CSI report and SR signaling with respect to the SCell can be transmitted through the SCell. Accordingly, simultaneous transmission of PUCCHs in a plurality of cells needs to be performed/permitted in inter-site CA (or similar CA structure), distinguished from the conventional technology. However, permission of simultaneous PUCCH transmission in multiple cells may deteriorate single carrier property of UL signals according to state/conditions (e.g. hardware and location) of the UE so as to cause UL performance loss.

Therefore, the present invention provides setting of whether simultaneous transmission of multiple PUCCHs is permitted through higher layer signaling (e.g. RRC signaling). Here, simultaneous transmission of multiple PUCCHs includes simultaneous transmission of multiple PUCCHs in multiple cells (i.e. simultaneous transmission of PUCCHs for respective cells). For convenience, a parameter that indicates whether simultaneous transmission of PUCCHs is permitted is defined as "multi-PUCCH". When the multi-PUCCH is set to ON, a UE can perform simultaneous transmission of multiple PUCCHs within one UL subframe. When the multi-PUCCH is set to OFF, the UE cannot perform simultaneous transmission of multiple PUCCHs within one UL subframe. That is, when the multi-PUCCH is OFF, simultaneous transmission of multiple PUCCHs within one UL subframe is not permitted and only transmission of a single PUCCH can be permitted in one UL subframe (in a single cell).

In the meantime, it is possible to set whether to permit (i) simultaneous transmission of periodic CSI and a period/aperiodic SRS in different cells, (ii) simultaneous transmission of periodic CSI and aperiodic CSI in different cells, (iii) simultaneous transmission of multiple aperiodic CSIs in different cells and/or (iv) simultaneous transmission of an SR and a periodic/aperiodic SRS in different cells, through higher layer signaling (e.g. RRC signaling). In addition, whether to permit simultaneous transmission of HARQ-ACK and a periodic/aperiodic SRS in different cells can be set through higher layer signaling (e.g. RRC signaling).

Furthermore, whether to permit simultaneous transmission of an SRS and UCI can be independently set per cell (group) through higher layer signaling (e.g., RRC signaling). The shortened PUCCH format can be used when simultaneous transmission of the SRS and UCI is permitted, whereas the normal PUCCH format can be used when simultaneous transmission of the SRS and UCI is not permitted.

Meanwhile, an additional UE operation/procedure may be needed in order to support setting of multi-PUCCH ON/OFF in inter-site CA (or similar CA structure). For example, multiple PUCCHs can be simultaneously transmitted in one UL subframe in the case of multi-PUCCH ON. In the case of maximum power limitation (e.g., when UE transmit power exceeds a UE maximum power limit), appropriate UL power adjustment is necessary for the plurality of PUCCHs. Furthermore, since only one PUCCH can be transmitted in one UL subframe in the case of multi-PUCCH OFF, PUCCH transmissions for respective cells need to be performed at different timings. Accordingly, UCI (e.g. ACK/NACK) transmission timing per cell needs to be changed. A description will be given of a UL power control method and a UCI transmission method for inter-site CA and multi-PUCCH ON/OFF state (or similar structure).

To aid in understanding of the present invention, it is assumed that two cell groups are aggregated for one UE. For example, it is assumed that cell group 1 and cell group 2 are aggregated for one UE. Here, a cell group includes one or more cells. Accordingly, a cell group can be composed of only one cell or a plurality of cells. Respectively cell groups may belong to different eNBs. Specifically, a PCell group and an SCell group can be aggregated for one UE, the PCell group can belong to eNB-1 (e.g. macro eNB) and the SCell group can belong to eNB-2 (e.g. micro eNB). The PCell group refers to a cell group including a PCell. The PCell group is composed of the PCell alone or includes the PCell and one or more SCells. The SCell group refers to a cell group composed of SCells only and includes one or more SCells. However, this is exemplary and the present invention can be equally/similarly applied to a case in which three or more cell groups (e.g. one PCell group and two or more SCell groups) are aggregated for one UE.

In addition, the present invention provides a UL power control method when multiple cell groups are aggregated for one UE and multiple UL transmissions (e.g. transmissions of UCI, PUCCH, PUSCH, PRACH, SRS and the like) are performed in the multiple cell groups. Accordingly, although the following description focuses on a case in which multiple cell groups belonging to different eNBs are aggregated for one UE, this is exemplary and the present invention can also be equally/similarly applied to a case in which multiple cell groups belonging to one eNB are aggregated for one UE.

Meanwhile, if a Pcell group and a Scell group are aggregated to a single UE, it may be able to configure PUCCH to be transmitted via Pcell in the Pcell group and configure PUCCH to be transmitted via a specific Scell in the Scell group. For clarity, the Scell configured to transmit the PUCCH in the Scell group is referred to as ACell. In this case, (i) the Pcell group and the Scell group may belong to eNBs different from each other (e.g., Pcell—macro eNB, Scell—micro eNB), ii) the Pcell group and the Scell group may belong to a same eNB. In the following, the Scell may correspond to a remaining normal Scell except the Pcell and the ACell.

In the following, a method of adjusting power is explained in detail when a plurality of UL transmissions are performed in a plurality of cells (groups). In the following description, a cell can be extended to a cell group.

Figure 15:
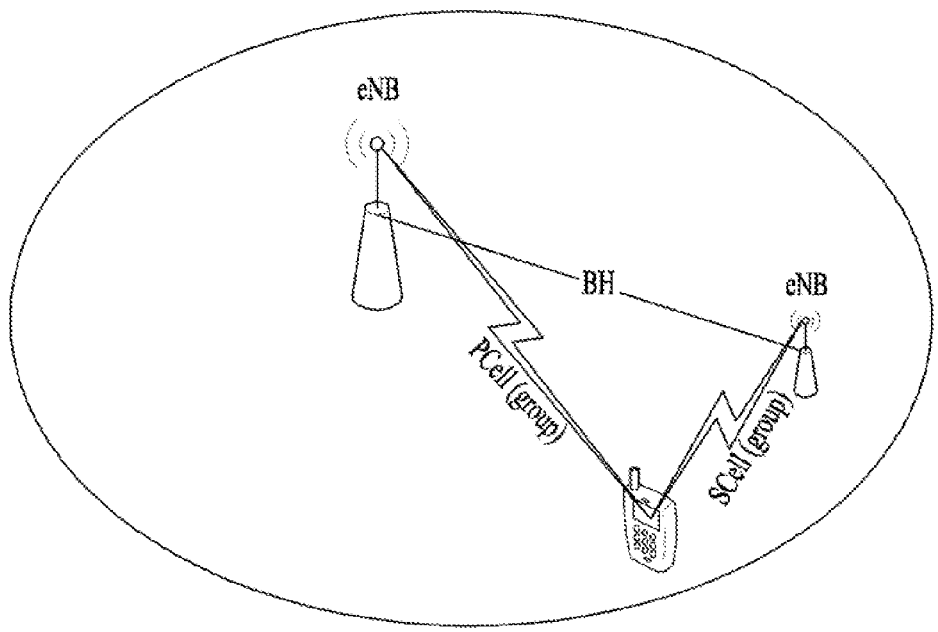
FIG. 15 illustrates UL power control according to an embodiment of the present invention.

FIG. 15 illustrates UL power control according to an embodiment of the present invention. Referring to FIG. 15, if UL transmission is performed at the same time in a Pcell (group) and a Scell (group) and a situation corresponds to a maximum power limitation situation, UL transmission of the Pcell (group) and/or the Scell (group) may be restricted in terms of power or can be abandoned. Specifically, transmission timings of channels/UCIs described in the following can be overlapped with each other in a UL subframe. In this case, "PUCCH with X" corresponds to PUCCH on which UCI X is transmitted and "PUSCH with Y" corresponds to PUSCH on which UCI Y is piggybacked. "Z+W" corresponds to a case that UCI Z and UCI W are transmitted together.

1) PUCCH with A/N
2) PUCCH with p-CSI
3) PUCCH with SR
4) PUCCH with A/N+p-CSI
5) PUCCH with A/N+SR
6) PUCCH with A/N+p-CSI+SR
7) PUSCH with A/N
8) PUSCH with p-CSI
9) PUSCH with a-CSI
10) PUSCH with A/N+p-CSI
11) PUSCH with A/N+a-CSI The present invention proposes channel/UCI protection priority for determining a channel/UCI to reduce power or abandon transmission in a maximum power limitation situation. UE total maximum power (hereinafter, $P_{ue\text{-}max}$), cell group maximum power (hereinafter, $P_{cg\text{-}max}$) and cell maximum power (hereinafter, $P_{c\text{-}max}$) can be set to a single UE. The maximum power limitation situation may occur when transmit power of a corresponding channel/UCI(s) exceeds at least one selected from the group consisting of the UE total maximum power ($P_{ue\text{-}max}$), the cell group maximum power ($P_{cg\text{-}max}$) and the cell maximum power ($P_{c\text{-}max}$). A UE can perform a UL power adjustment procedure in a manner of preferentially reducing power or giving up transmission for a channel/UCI of which protection priority is lower. It may use various methods to reduce transmit power of the channel/UCI of which the protection priority is lower. For example, assume that transmit power of a channel/UCI of which protection priority is high corresponds to $P_A$ and transmit power of a channel/UCI of which protection priority is low corresponds to $P_B$. In this case, if such a situation as $P_A+P_B>P_{max,UE}$ occurs, a UE can reduce the $P_B$ to $P_B'$ or can make the $P_B$ to be zero (0). The $P_B'$ may have such a form as $\alpha*P_B$, $P_B-\beta$, or $\alpha*P_B\pm\beta$. In this case, a unit of power value may correspond to a linear-scale value or a log-scale value. The $\alpha$ is equal to or greater than 0 and less than 1. The $\beta$ corresponds to a real positive number. For example, it may be able to determine $\alpha$ satisfying $P_A+\alpha*P_B\leq P_{max,UE}$. In the following, unless it is differently mentioned, priority indicates the channel/UCI protection priority.

<Collision Between PUCCHs>

In the present method, priority may corresponds to 1) channel/UCI protection priority for reducing power or determining a channel/UCI giving up transmission in case that multi-PUCCH ON is set to a UE capable of transmitting a plurality of PUCCHs at the same time (on a plurality of cells/carriers), or 2) channel/UCI protection priority for determining a channel/UCI giving up transmission in case that multi-PUCCH OFF is set to a UE capable of transmitting a plurality of PUCCHs at the same time or in case of a UE incapable of transmitting a plurality of PUCCHs at the same time.

A. Rule 1-1: UCI Priority

UCI priority can be determined as A/N>SR>p-CSI or AN=SR>p-CSI. When a plurality of UCIs are transmitted via a PUCCH, power adjustment/transmission abandonment can be determined on the basis of priority of highest priority UCI. Specifically, if simultaneous transmission of a plurality of PUCCHs is required in a single UL subframe, it may be able to preferentially apply power reduction or transmission abandonment to a PUCCH of which the priority of the highest priority UCI is low. If the priority of the highest priority UCI is identical between PUCCHs, it may reduce power of each PUCCH with a same rate (i.e., equal scaling) or it may be able to preferentially apply power reduction or transmission abandonment to PUCCH of which $2^{nd}$ highest UCI priority (or $3^{rd}$ highest UCI priority) is low. If priority of $1^{st}$ and/or $2^{nd}$ highest priority UCI are identical to each other while the number of UCIs transmitted on PUCCH is different, power reduction or transmission abandonment can be preferentially applied to PUCCH of which the number of UCIs is smaller. For example, it may be able to apply priority in an order of (A/N+p-CSI+SR)>(A/N+SR)>(A/N+p-CSI)>A/N>=SR>p-CSI.

B. Rule 1-2: Power Level

It may be able to preferentially apply power reduction or transmission abandonment to PUCCH including a high power value. On the contrary, it may be able to preferentially apply power reduction or transmission abandonment to PUCCH including a low power value. Or, it may be able to preferentially apply power reduction or transmission abandonment to PUCCH of a cell (cell group) where a maximum power limit is high. On the contrary, it may be able to preferentially apply power reduction or transmission abandonment to PUCCH of a cell (cell group) where a maximum power limit is low.

Rule 1-3: PUCCH Format

A higher priority can be given to a PUCCH format 3 compared to other PUCCH formats (e.g., 2/2a/2b, 1/1a/1b). And, a higher priority can be given to a PUCCH format 1 series (e.g., 1/1a/1b) compared to a PUCCH format 2 series (e.g., 2/2a/2b). And, a higher priority can be given to a PUCCH format (e.g., 1/1a/1b, 2a/2b) in which A/N or SR is transmitted compared to a PUCCH format (e.g., 2) in which CSI is transmitted only. And, a higher priority can be given to a PUCCH format 2 series (e.g., 2a/2b) in which CSI and A/N are transmitted at the same time compared to a PUCCH format 1 series (e.g., 1/1a/1b) in which A/N and/or SR is transmitted. And, a higher priority can be given to a shortened PUCCH format configured/used for transmitting/protecting SRS (in response to an identical PUCCH format) compared to a normal PUCCH format. On the contrary, a higher priority can be given to a normal PUCCH format compared to a shortened PUCCH format.

Rule 1-4: UCI Size

It may be able to preferentially apply power reduction or transmission abandonment to PUCCH on which less UCI bit or less A/N (and/or SR) bit is transmitted. And, it may be able to preferentially apply power reduction or transmission abandonment to PUCCH on which A/N corresponding to the less number of cells or A/N corresponding to the less number of TBs (transport blocks) is transmitted.

Rule 1-5: CSI Type/Size

It may be able to preferentially apply power reduction or transmission abandonment to PUCCH on which a CSI type of low priority is transmitted. For example, priority between CSI types may follow such an order as CSI type 3, 5, 6, 2a>CSI type 2, 2b, 2c, 4>CSI type 1, 1a. And, it may be able to preferentially apply power reduction or transmission abandonment to PUCCH in which CSI on the less number of cell is transmitted or PUCCH on which CSI on a cell of low priority is transmitted. Priority between cells can be designated in advance or can be configured via RRC signaling and the like. Informations fed back according to a CSI type are described in the following.

CSI type 1: CQI on a UE-selected subband
CSI type 1a: subband CQI and second PMI (precoding matrix index)
CSI type 2, 2b, 2c: wideband CQI and PMI
CSI type 2a: wideband PMI
CSI type 3: RI (rand indicator)
CSI type 4: wideband CQI
CSI type 5: RI and wideband PMI
CSI type 6: RI and PTI (precoding type indicator)

Rule 1-6: FDD vs. TDD

A higher priority can be given to PUCCH transmitted via a FDD cell compared to PUCCH transmitted via a TDD cell. On the contrary, a higher priority can be given to PUCCH transmitted via a TDD cell compared to PUCCH transmitted via a FDD cell.

Rule 1-7: CP Length

A higher priority can be given to PUCCH transmitted via a cell configured by an extended CP compared to PUCCH transmitted via a cell configured by a normal CP. On the contrary, a higher priority can be given to PUCCH transmitted via a cell configured by a normal CP compared to PUCCH transmitted via a cell configured by an extended CP.

Rule 1-8: Cell Priority (If UCI priority and the like are identical between PUCCHs), it may apply a cell protection priority. The cell protection priority can be designated in advance (e.g., Pcell>Scell) or can be configured via RRC signaling or the like. As an example, if A/N transmission corresponding to DL data reception in Pcell (or a cell group to which the Pcell belongs thereto) and A/N transmission corresponding to DL data reception in Scell (or a cell group consisting of Scell only) are collided with each other at an identical timing, power reduction or transmission abandonment can be preferentially applied to PUCCH corresponding to Scell A/N.

An SR can be transmitted according to each cell (group). A plurality of SRs transmitted via a plurality of cells (groups) 1) can be configured to have a single timing/period identical to each other, or 2) can be configured to have a timing/period independent from each other.

The rule 1-1 to 1-8 can be independently used or can be used in a manner of being combined. In this case, a rule or a combination of rules to be applied can be designated in advance or can be configured via RRC signaling or the like.

<Collision Between PUSCHs>

In the present method, priority may corresponds to 1) channel/UCI protection priority for a UE capable of transmitting a plurality of PUSCHs at the same time (on a plurality of cells/carriers) to reduce power or determine a channel/UCI for giving up transmission in a maximum power limitation situation, or 2) channel/UCI protection priority for a UE incapable of transmitting a plurality of PUSCHs at the same time to determine a channel/UCI for giving up transmission.

Rule 2-1: UCI Priority

UCI priority can be determined as A/N>a-CSI>p-CSI or AN>a-CSI=p-CSI. When a plurality of UCIs are transmitted via a PUSCH, power adjustment/transmission abandonment can be determined on the basis of priority of highest priority UCI. Specifically, if simultaneous transmission of a plurality of PUSCHs is required in a single UL subframe, it may be able to preferentially apply power reduction or transmission abandonment to a PUSCH of which the priority of the highest priority UCI is low. If the priority of the highest priority UCI is identical between PUSCHs, it may reduce power of each PUSCH with a same rate or it may be able to preferentially apply power reduction or transmission abandonment to PUSCH of which priority of $2^{nd}$ highest UCI priority (or $3^{rd}$ highest UCI priority) is low. If priority of $1^{st}$ and/or $2^{nd}$ highest priority UCI are identical to each other while the number of UCIs transmitted on PUSCH is different, power reduction or transmission abandonment can be preferentially applied to PUSCH of which the number of UCIs is smaller. For example, it may be able to apply priority in an order of (A/N+a-CSI)>=(A/N+p-CSI)>(A/N)>a-CSI>=p-CSI.

B. Rule 2-2: Power Level

It may be able to preferentially apply power reduction or transmission abandonment to PUSCH including a high power value. On the contrary, it may be able to preferentially apply power reduction or transmission abandonment to PUSCH including a low power value. Or, it may be able to preferentially apply power reduction or transmission abandonment to PUSCH of a cell (cell group) where a maximum power limit is high. On the contrary, it may be able to preferentially apply power reduction or transmission abandonment to PUSCH of a cell (cell group) where a maximum power limit is low.

Rule 2-3: Rate-Matching (In order to transmit/protect an SRS), a higher priority can be given to PUSCH to which rate-matching is applied compared to PUSCH to which rate-matching is not applied. On the contrary, a higher protection priority can be given to PUSCH to which rate-matching is not applied compared to PUSCH to which rate-matching is applied.

Rule 2-4: UCI Size

It may be able to preferentially apply power reduction or transmission abandonment to PUSCH on which less UCI bit or less A/N (and/or SR) bit is transmitted. And, it may be able to preferentially apply power reduction or transmission abandonment to PUSCH on which A/N corresponding to the less number of cells or A/N corresponding to the less number of TBs is transmitted.

Rule 2-5: CSI Type/Size

It may be able to preferentially apply power reduction or transmission abandonment to PUSCH on which a CSI type of low priority is transmitted. For example, priority between CSI types may follow such an order as CSI type 3, 5, 6, 2a>CSI type 2, 2b, 2c, 4>CSI type 1, 1a. And, it may be able to preferentially apply power reduction or transmission abandonment to PUSCH in which CSI on the less number of cell is transmitted or PUSCH on which CSI on a cell of low priority is transmitted. Priority between cells can be designated in advance or can be configured via RRC signaling and the like.

Rule 2-6: FDD Vs. TDD

A higher priority can be given to PUSCH transmitted via a FDD cell compared to PUSCH transmitted via a TDD cell. On the contrary, a higher priority can be given to PUSCH transmitted via a TDD cell compared to PUSCH transmitted via a FDD cell.

Rule 2-7: CP Length

A higher priority can be given to PUSCH transmitted via a cell configured by an extended CP compared to PSCCH transmitted via a cell configured by a normal CP. On the contrary, a higher priority can be given to PUSCH transmitted via a cell configured by a normal CP compared to PUSCH transmitted via a cell configured by an extended CP.

Rule 2-8: Cell Priority (If UCI priority and the like are identical between PUSCHs), it may apply a cell protection priority. The cell protection priority can be designated in advance (e.g., Pcell>Scell) or can be configured via RRC signaling or the like. As an example, if A/N transmission corresponding to DL data reception in Pcell (or a cell group to which the Pcell belongs thereto) and A/N transmission corresponding to DL data reception in Scell (or a cell group consisting of Scell only) are collided with each other at an identical timing, power reduction or transmission abandonment can be preferentially applied to PUSCH including Scell A/N.

When collision occurs between PUSCHs w/o UCI (i.e., PUSCHs transmitted without UCI piggyback), it may apply the rule 2-2 (power level), the rule 2-3 (rate-matching), the rule 2-6 (FDD vs. TDD), and/or the rule 2-7 (CP length). More Specifically, in the rule 2, 3, 6 or 7, priority can be used for selecting a cell to which UCI corresponding to a specific cell group (consisting of at least one or more cells) to be piggyback (in the specific cell group) or PUSCH.

The rule 2-1 to 2-8 can be independently used or can be used in a manner of being combined. In this case, a rule or a combination of rules to be applied can be designated in advance or can be configured via RRC signaling or the like.

<Collision Between PUCCH/PUSCH>

In the present method, priority may corresponds to 1) channel/UCI protection priority for determining a channel/UCI to reduce power or give up transmission in a maximum power limitation situation when a UE capable of transmitting PUCCH/PUSCH at the same time (on a plurality of cells/carriers) is configured/permitted to transmit PUCCH/PUSCH at the same time or 2) channel/UCI protection priority for determining a channel/UCI to give up transmission when a UE capable of transmitting PUCCH/PUSCH at the same time is not configured/permitted to transmit PUCCH/PUSCH at the same time or a UE is incapable of transmitting PUCCH/PUSCH at the same time.

Rule 3-1: UCI/Channel Priority

UCI priority may follow the scheme defined in Rule 1-1 and 2-1 and channel priority may follow PUCCH>PUSCH. It may be able to preferentially apply the UCI priority and may then able to apply the channel priority. As an example, when the UCI priority is identical to each other or UCI priority transmitted on PUSCH is lower, power reduction or transmission abandonment can be preferentially applied to PUSCH. When UCI priority transmitted on PUCCH is lower, power reduction or transmission abandonment can be preferentially applied to PUCCH. As a different example, channel priority may follow PUCCH<PUSCH. In this case, when protection priority of UCI transmitted on PUSCH is lower, power reduction or transmission abandonment can be preferentially applied to PUSCH. When UCI protection priority is identical to each other or protection priority of UCI transmitted on PUCCH is lower, power reduction or transmission abandonment can be preferentially applied to PUCCH.

Rule 3-2: Power Level

It may be able to preferentially apply power reduction or transmission abandonment to a channel including a high power value. On the contrary, it may be able to preferentially apply power reduction or transmission abandonment to a channel including a low power value. Or, it may be able to preferentially apply power reduction or transmission abandonment to a channel of a cell (or a cell group) where a maximum power limit is high. On the contrary, it may be able to preferentially apply power reduction or transmission abandonment to a channel of a cell (or a cell group) where a maximum power limit is low.

Rule 3-3: Channel Format

A higher priority can be given to a PUCCH format 3 compared to PUSCH. And, a higher priority can be given to a PUSCH with A/N compared to a PUCCH format 1 series (e.g., 1/1a/1b) and/or a PUCCH format 2 series (e.g., 2/2a/2b). And, a higher priority can be given to a PUCCH format 2 series (e.g., 2a/2b) in which simultaneous transmission of CSI and A/N is performed compared to PUSCH with A/N. And, a higher priority can be given to PUSCH with A/N to which rate-matching is applied compared to PUCCH and/or a higher priority can be given to PUCCH (with A/N) compared to PUSCH with A/N to which rate-matching is not applied. Or, it may also apply an opposite priority (e.g., non-rate-matched PUSCH with A/N>PUCCH, and/or PUCCH (with A/N)>rate-matched PUSCH with A/N). And, a higher priority can be given to a shortened PUCCH format with A/N compared to PUSCH and/or a higher protection priority can be given to PUSCH (with A/N) compared to normal PUCCH format with A/N. Or, it may also apply an opposite protection priority (e.g., normal PUCCH format with A/N>PUSCH, and/or PUSCH (with A/N)>shortened PUCCH format with A/N).

Rule 3-4: UCI Size

It may be able to preferentially apply power reduction or transmission abandonment to a channel on which less UCI bit or less A/N (and/or SR) bit is transmitted. And, it may be able to preferentially apply power reduction or transmission abandonment to a channel on which A/N corresponding to the less number of cell or A/N corresponding to the less number of TB is transmitted.

Rule 3-5: CSI Type/Size

It may be able to preferentially apply power reduction or transmission abandonment to a channel on which a CSI type of low priority is transmitted. For example, priority of a CSI type may follow such an order as CSI type 3, 5, 6, 2a>CSI type 2, 2b, 2c, 4>CSI type 1, 1a. And, it may be able to preferentially apply power reduction or transmission abandonment to a channel on which CSI on the less number of cell is transmitted or a channel on which CSI on a cell of low priority is transmitted. Priority between cells can be designated in advance or can be configured via RRC signaling and the like.

Rule 3-6: FDD Vs. TDD

A higher priority can be given to a channel transmitted via a FDD cell compared to a channel transmitted via a TDD cell. On the contrary, a higher priority can be given to a channel transmitted via a TDD cell compared to a channel transmitted via a FDD cell.

Rule 3-7: CP Length

A higher priority can be given to a channel transmitted via a cell configured by an extended CP compared to a channel transmitted via a cell configured by a normal CP. On the contrary, a higher priority can be given to a channel transmitted via a cell configured by a normal CP compared to a channel transmitted via a cell configured by an extended CP.

Rule 3-8: Cell Priority (If UCI priority and the like are identical between channels), it may be able to apply a cell protection priority. The cell protection priority can be determined in advance (e.g., Pcell>Scell) or can be configured via RRC signaling or the like. As an example, if A/N transmission corresponding to DL data reception in Pcell (or a cell group to which the Pcell belongs thereto) and A/N transmission corresponding to DL data reception in Scell (or a cell group consisting of Scell only) are collided with each other at an identical timing, power reduction or transmission abandonment can be preferentially applied to a channel on which Scell A/N is carried.

The rule 3-1 to 3-8 can be independently used or can be used in a manner of being combined. In this case, a rule or a combination of rules to be applied can be designated in advance or can be configured via RRC signaling or the like.

Meanwhile, transmission timings of PRACH and/or SRS can be overlapped with each other in an identical subframe. Or, transmission timings of PRACH and/or SRS and transmission timings of PUCCH and/or PUSCH can be overlapped with each other in an identical subframe. In this case, it may follow priority in an order of PRACH>PUCCH/PUSCH>SRS. Priority of PUCCH/PUSCH can be determined by Rule 3-1 to 3-8. And, when collision occurs between PRACHs and collision occurs between SRSs, it may be able to reduce power by applying equal scaling. Or, it may be able to apply the rule 3-2 (power level), the rule 3-6 (FDD vs. TDD), the rule 3-7 (CP length), and/or the rule 3-8 (cell priority). Or, it may be able to apply power reduction/transmission abandonment according to a protection priority between cells (designated in advance or configured via RRC signaling). And, when collision occurs between PRACHs, a higher protection priority can be given to a PRACH format including longer (or shorter) OFDMA/SC-FDMA symbol period (duration). Or, a higher protection priority can be given to a retransmitted PRACH compared to an initially transmitted PRACH.

When a protection priority is given between cells to handle collision between PRACHs, the protection priority can be considered as a protection priority between TAGs in a situation that a plurality of TAGs are set to a single UE. In order to optimize overhead resulted from adjusting uplink sync in CA situation, serving cells showing a similar time sync characteristic are managed by TAG. One of more TAGs can be set to a single cell group (i.e., Pcell group, Scell group). Specifically, if transmissions of a plurality of PRACHs are overlapped with each at the same timing (e.g., SF), protection priority between TAGs can be defined as follows: TAG including Pcell while belonging to Pcell group>TAG including ACell while belonging to Scell group>TAG not including Pcell while belonging to Pcell group>TAG not including ACell while belonging to Scell group.

And, if a plurality of PRACHs transmitted from a different cell (group) are overlapped with each other at the same timing, it may consider a scheme of selectively transmitting a PRACH only among a plurality of the PRACHs at the timing according to a specific protection priority including or a random determination of a UE. In this case, in case of the remaining PRACHs except the selected/transmitted PRACH, Alt 1) it may omit/give up transmission of the PRACHs or Alt 2) the remaining PRACHs can be transmitted via a specific SF existing after the timing (e.g., closest timing) and capable of transmitting a PRACH (i.e., delayed transmission). As an example, if the aforementioned scheme is applied in a situation that PRACH transmission (i.e., scheduled PRACH) indicated by an eNB (e.g., PDCCH order) and PRACH transmission not indicated by the eNB (i.e., non-scheduled PRACH) are overlapped with each other at the same timing, the scheduled PRACH is transmitted only at the timing and the non-scheduled PRACH may be transmitted in a manner of being delayed. Or, transmission of the non-scheduled PRACH can be omitted or given up. Meanwhile, the aforementioned scheme can be restricted to a UE operation in a situation that a maximum power limitation has exceeded. All of a plurality of the PRACHs can be transmitted at the timing in the rest of situations.

Meanwhile, if a plurality of (positive) SRs transmitted from a different cell (group) are overlapped with each other at the same timing (e.g., SF), a higher protection priority can be given to an SR of which pending time is longer (e.g., sr-ProhibitTimer or SR_COUNTER value is bigger). The sr-ProhibitTimer waits for transmission of a next SR after an SR is transmitted to avoid frequent SR transmission. The SR_COUNTER is initialized by 0 when an SR is triggered. Whenever an SR is transmitted via PUCCH, the SR_COUNTER increases by (+1). If the SR_COUNTER exceeds the upper limit, a RACH procedure is triggered. If the RACH procedure is triggered, it is considered as an SR is pending until the SR is cancelled. If there is a pending SR, a UE transmits the SR via PUCCH, updates SR_COUNTER by SR_COUNTER+1, and initiates the sr-ProhibitTimer. If there is a pending SR until the sr-ProhibitTimer expires, the UE repeats the previous operation.

If an SR and a BSR transmitted from a different cell (group) are overlapped with each other at the same timing, a higher protection priority can be given to the BSR including more specific UE buffer status information. As a different method, in order to avoid SR transmission capability degradation and UL scheduling delay resulted from collision among a plurality of SRs, a UE may operate under an assumption/consideration that SR transmission (subframe) timing is configured not to be overlapped between cells (groups) different from each other. Hence, if transmissions of a plurality of SRs are overlapped with each other at the same timing, the UE considers it as there is an error in transmitting SRs at the timing. Hence, the UE drops all transmissions of a plurality of the SRs or may be able to transmit a single SR only among a plurality of the SRs. And, when an SR and A/N transmitted from a different cell (group) are overlapped with each other at the same timing, if pending time (e.g., sr-ProhibitTimer or SR_COUNTER value) is less than a specific value, a higher protection priority can be given to the A/N or two UCIs may have identical protection priority. If the pending time exceeds the specific value, a higher protection priority can be given to the SR.

When a plurality of cell groups are configured, UL power control can be performed by 2 steps described in the following. Power control can be performed in a linear domain or a dB domain.

Step 1) It is able to adjust UL transmit power of each cell to be equal to or less than maximum power limit set to each cell or it is able to adjust the sum of UL transmit power of all cells belonging to each cell group to be equal to or less than UE maximum power limit (or maximum power limit set to a corresponding cell group) according to a cell group. To this end, it is able to apply a power control scheme based on a protection priority proposed by the present invention or a legacy power control scheme (e.g., 3GPP Rel-11 UL power control (Rel-11 PC)) according to a cell group. In this case, the Rel-11 PC corresponds to a power control scheme based on a protection priority in an order of PRACH>PUCCH>PUCCH with UCI>PUSCH w/o UCI>SRS. For details, t may refer to 3GPP TS 36.213 Rel-11 "5.1 Uplink power control".

Specifically, Rel-11 PC is performed as follows in a maximum power limitation situation. If total transmit power of a UE exceeds maximum power limit ($\hat{P}_{CMAX}(i)$) in a subframe i, the UE reduces PUSCH transmit power ($\hat{P}_{PUSCH,c}(i)$) of a serving cell c to satisfy a condition of equation 1.

$$\sum_c w(i) \cdot \hat{P}_{PUSCH,c}(i) \le (\hat{P}_{CMAX}(i) - \hat{P}_{PUCCH}(i))$$ [Equation 1]

In this case, "^" indicates a linear value and $\hat{P}_{PUCCH}(i)$ indicates PUCCH transmit power of a subframe i. If there is no PUCCH transmission, $\hat{P}_{PUCCH}(i)$ is 0. C indicates a cell index and w(i) indicates a scaling factor for the $\hat{P}_{PUCCH}(i)$ in the subframe i. The w(i) is equal to or greater than 0 and equal to or less than 1 (0≤w(i)≤1).

If the UE has PUSCH with UCI transmission in a serving cell j, the UE has PUSCH w/o UCI transmission in the remained serving cell, and total transmit power of the UE exceeds maximum power limit ($\hat{P}_{CMAX}(i)$) of the UE, the UE reduces PUSCH transmit power ($\hat{P}_{PUSCH,c}(i)$) of the serving cell c to satisfy a condition of equation 2.

$$\sum_{c \ne j} w(i) \cdot \hat{P}_{PUSCH,c}(i) \le (\hat{P}_{CMAX}(i) - \hat{P}_{PUSCH,j}(i))$$ [Equation 2]

If the UE has PUSCH with UCI transmission+PUCCH transmission in the serving cell j, the UE has PUSCH w/o UCI transmission in the remained serving cell, and total transmit power of the UE exceeds maximum power limit ($\hat{P}_{CMAX}(i)$) of the UE, the UE reduces PUSCH transmit power ($\hat{P}_{PUSCH,c}(i)$) of the serving cell c to satisfy a condition of equation 3.

$$\hat{P}_{PUSCH,j}(i) = \min(\hat{P}_{PUSCH,j}(i), (\hat{P}_{CMAX}(i) - \hat{P}_{PUCCH}(i)))$$ [Equation 3]

$$\sum_{c \ne j} w(i) \cdot \hat{P}_{PUSCH,c}(i) \le (\hat{P}_{CMAX}(i) - \hat{P}_{PUCCH}(i) - \hat{P}_{PUSCH,j}(i))$$

Step 2) If the sum (i.e., $P_{cg\text{-}sum}$) of UL transmit power of all cells (groups) calculated in the step 1 exceeds maximum power limit (i.e., $P_{ue\text{-}max}$) of the UE, it may be able to more reduce UL transmit power as much as $P_{over} = (P_{cg\text{-}sum} - P_{ue\text{-}max})$ corresponding to at least power over the power limit in a manner of applying a scaling factor to UL transmit power of each cell group. In this case, n indicates a cell group index and the scaling factor corresponds to a real number equal to or less than 1 including 0. In order not to exceed ($P_{cg\text{-}n}$×scaling factor), it may be able to more apply a power control scheme proposed by the present invention based on a protection priority or a legacy power control scheme (e.g., 3GPP Rel-11 UL power control (Rel-11 PC)) according to a cell group. Or, in order not to exceed ($P_{cg\text{-}n}$×scaling factor), a scaling factor, which is applied to each cell group, can be applied to each cell/channel belonging to a cell group as it is.

A scaling factor applied to each cell group can be configured as follows.

Alt 0) The scaling factor can be directly configured by an eNB.

Alt 1) The scaling factor can be configured to have an identical reduction rate (i.e., an identical scaling factor) for all cell groups.

Alt 2) The scaling factor can be configured in proportion to the number of cells belonging to a cell group. In this case, the number of cells within a cell group may corresponds to the number of cells configured to belong to a cell group (or, activated cells in an SF (i.e., an SF in which uplink signal is transmitted) in which transmit power control is performed, cells of which random UL channel transmission is reserved, cells of which specific important UL channel/signal (e.g., PRACH or PUCCH/PUSCH (carrying specific UCI (e.g., (A/N))) transmission is reserved).

Alt 3) It may be able to preferentially reduce power from a cell group of which the number of cells in a cell group is smallest (or biggest) based on the Alt 2. For example, if power of a cell group of which the number of cells belonging to the cell group is smallest/biggest is less than $P_{OVER}$, it may reduce power of the cell group (e.g., reduce to 0) and it may be then able to reduce power of a cell group of which the number cells belonging to the cell group is second smallest/second biggest. By doing so, it may be able to sequentially reduce power until the power is reduced as much as $P_{OVER}$.

As an example, in a situation that the number of (transmitted) cells of a cell group 1 and the number of (transmitted) cells of a cell group 2 correspond to 2 and 3, respectively, assume that power of the cell group 1 and power of the cell group 2 are set to $P_{cg\text{-}1}$ and $P_{cg\text{-}2}$, respectively after the Step 1 is applied. First of all, in case of the Alt 1, final power of the cell group 1 is readjusted to be equal to or less than $(P_{cg\text{-}1}/P_{cg\text{-}sum}) \times P_{ue\text{-}max}$ in a manner of applying such a scaling factor as $W = (P_{ue\text{-}max}/P_{cg\text{-}sum})$ to the cell group 1. Similarly, final power of the cell group 2 can be readjusted to be equal to or less than $(P_{cg\text{-}2}/P_{cg\text{-}sum}) \times P_{ue\text{-}max}$ in a manner of applying such a scaling factor as $W = (P_{ue\text{-}max}/P_{cg\text{-}sum})$ to the cell group 2. Secondly, in case of the Alt 2, it may be able to apply such a scaling factor as a value resulted from multiplying (number of cells in a corresponding cell group/ total number of cells)=2/5 (cell group 1) or 3/5 (cell group 2) by the scaling factor per cell group in the Alt 1. Hence, final power of the cell group 1 can be readjusted to be equal to or less than $(P_{cg-1}/P_{cg-sum}) \times Y \times (2/5) \times P_{ue-max}$ and final power of the second cell group can be readjusted to be equal or less than $(P_{cg-2}/P_{cg-sum}) \times Y \times (3/5) \times P_{ue-max}$. In this case, the Y can be determined by a maximum value that makes the sum of $(P_{cg-1}/P_{cg-sum}) \times Y \times (2/5) \times P_{ue-max}$ and $(P_{cg-2}/P_{cg-sum}) \times Y \times (3/5) \times P_{ue-max}$ to be equal to or less than $P_{ue-max}$. In particular, the Y can be determined by a maximum value satisfying equation 4. In this case, final transmit power $(P'_{cg-i})$ of a cell group i can be given by equation 5. In case of the Alt 3, it may compare the scaling factor per cell group in the Alt 2 (or the Alt 1) and may be able to preferentially reduce power from a cell group including a smaller (or a bigger) scaling factor value first. Meanwhile, in order to readjust power per cell group in the step 2, it may apply the Rel-11 PC scheme.

$$Y \leq \frac{(a_1 + a_2 + \ldots a_n) \cdot P_{cg-sum}}{a_1 \cdot P_{cg-1} + a_2 \cdot P_{cg-2} + \ldots a_n \cdot P_{cg-n}} \quad \text{[Equation 4]}$$

$$P'_{cg-i} \leq \frac{P_{cg-i}}{P_{cg-sum}} \cdot \frac{(a_1 + a_2 + \ldots a_n) \cdot P_{cg-sum}}{a_1 \cdot P_{cg-1} + a_2 \cdot P_{cg-2} + \ldots a_n \cdot P_{cg-n}} \cdot \quad \text{[Equation 5]}$$

$$\frac{a_i}{a_1 + a_2 + \ldots a_n} \cdot P_{us-max} = \frac{a_i \cdot P_{cg-i} \cdot P_{us-max}}{a_1 \cdot P_{cg-1} + a_2 \cdot P_{cg-2} + \ldots a_n \cdot P_{cg-n}}$$

As a different example, in the same situation, Alt 1) it may be able to readjust final power of each cell group to be equal or less than $(P_{ue-max} \times \text{scaling factor}) = (P_{us-max}/2)$ by applying such an identical scaling factor as (1/total number of cell groups)=1/2 to both the cell group 1 and the cell group 2. Alt 2) It may be able to readjust final power of each cell group to be equal or less than $(P_{ue-max} \times \text{scaling factor})$ by applying such a scaling factor as (number of cells belonging to a cell group/total number of cells)=2/5 (cell group 1) or 3/5 (cell group 2) to each cell group. Alt 3) It is able to preferentially reduce power from the cell group 1 of which the number of cells is smaller (or bigger). In this case, in order to readjust power per cell group in the step 2, it may also be able to apply the Rel-11 PC scheme.

<UL Power Control Method>

In the inter-site CA situation, it may be able to configure a cell group belonging to each eNB (i.e., a cell group managed/controlled by each eNB). In this case, it may be able to designate Pcell to transmit UCI (e.g., HARQ-ACK) using PUCCH and/or DCI (e.g., for RAR scheduling) using CSS to each cell group in Pcell group. And, it may be able to designate ACell to transmit UCI (e.g., HARQ-ACK) using PUCCH and/or DCI (e.g., for RAR scheduling) using CSS to each cell group in Scell group.

In this situation, TAG, which applies an identical TA value, can be configured according to a cell group in consideration of backhaul latency and the like between cell groups (i.e., between eNBs). This may indicate that one or more TAGs can be configured in each cell group and cells configuring a single TAG may belong to an identical cell group. In particular, cells belonging to a different cell group are unable to configure an identical TAG. In this case, when a TAG includes ACell in Scell group, 1) PRACH preamble transmission for UL synch can be restricted to be performed by the ACell only or 2) PRACH preamble transmission for UL synch can be performed by a random cell in the TAG without any restriction although CSS scheduling is performed in the ACell. And, a RSRP reference cell, which is used for measuring (DL) RSRP to calculate (UL) path-loss, can be separately configured in the ACell and the Scell. The path-loss is used for controlling UL power. Specifically, in case of the ACell, the ACell itself can be designated as the RSRP reference cell. In case of the Scell (except the ACell) belonging to TAG including the ACell, 1) a specific cell (belonging to the TAG) (e.g., the ACell or the Scell itself) can be configured as the RSRP reference cell via higher layer signaling or 2) the Scell itself can be designated as the RSRP reference cell without signaling.

Meanwhile, it may be able to apply a cell group-based operation scheme similar to the present invention to an (identical eNB-based) legacy CA situation. In this case, a specific cell belonging to Scell group can be designated as ACell that performs UCI (e.g., HARQ-ACK) transmission using PUCCH. In this case, TAG is configured according to a cell group and at least one or more TAGs can be configured in each cell group. Cells constructing a single TAG can be configured to belong to an identical cell group. When a PRACH preamble is transmitted to a TAG including ACell, it may be able to configure the ACell to perform the PRACH preamble transmission only. In this case, a RSRP reference cell of the ACell and a RSRP reference cell of Scell (except the ACell) belonging to TAG including the ACell can be designated by the ACell itself and a specific cell in the TAG (e.g., ACell or Scell itself), respectively.

And, configuration/reconfiguration and release of the ACell can be semi-statically performed via an RRC signal or the like. In case of Scell designated as ACell, the Scell may be in an active state all the time to transmit PUCCH on which UCI is carried. Hence, a MAC message indicating whether to activate/deactivate the Scell may not include information on the ACell.

Meanwhile, when a cell group-based operation scheme is applied in an identical eNB-based legacy CA situation, since backhaul delay between cell groups does not make any problem, it may consider a method of reconfiguring ACell (and a method of readjusting UL synch) via a (non-contention-based) random access procedure. For example, an eNB is able to indicate whether or not a specific cell belonging to Scell group is reconfigured as ACell via (i) a PDCCH order (Msg0) for indicating PRACH preamble (Message1, Msg1) transmission, (ii) a RAR (Msg2) which is transmitted for a PRACH reception response, or (iii) PDSCH (e.g., Msg4) which is immediately transmitted in response to the Msg3. As a different method, in order to more flexibly and dynamically reconfigure the ACell, it may be able to signal a cell to be reconfigured as the ACell among cells belonging to Scell group via MAC message for indicating activation/deactivation of the Scell.

And, when a specific cell is reconfigured as ACell via a higher layer signal (e.g., RRC or MAC) in the cell group-based (inter-eNB or intra-eNB) CA situation, the higher layer signal can additionally include signaling for indicating PRACH preamble transmission (and a random access procedure such as RAR reception and the like) via the specific cell. And, the higher layer signal can further include information/parameter (e.g., PRACH preamble resource, PRACH preamble index, PRACH mask index, etc.) necessary for the random access procedure. Meanwhile, in case of a legacy random access procedure, Msg3 scheduled by RAR is transmitted via PUSCH. If a PRACH preamble is transmitted via ACell, the Msg3 can be transmitted via PUCCH instead of PUSCH. In this case, information/parameter (e.g., PUCCH resource index) related to a resource of the PUCCH transmission can be indicated by RAR.

Power control using a DCI format is explained in the following. Power control using a DCI format (e.g., DL/UL grant DCI format including a TPC command and/or a DCI format 3/3A for controlling power of a UE group) can also be applied to a case that a single cell is configured. For clarity, although description in the following mainly concerns a DCI format 3/3A, the description in the following can be identically/similarly applied to a DCI format including a TPC field. Specifically, according to the related art, an identical TPC command value and/or the number of types is applied to all cells. For example, a legacy TPC command has 4 values in total including −1, 0, 1, and 3 dB (i.e., a TPC field size of 2 bits). Meanwhile, it may be able to configure/apply an independent TPC command value and/or number of types (e.g., an independent TPC field size) according to a cell or a cell group in consideration of a coverage difference between cells and/or different interference environment in a CA (or other different CA) situation that a macro cell and a micro cell are aggregated. For example, when PUCCH is transmitted in Pcell and PUCCH is transmitted in a specific ACell, it may be able to differently configure a TPC command value and/or number of types (e.g., a TPC field size in DL grant). Hence, a payload size of a DCI format 3/3A may vary according to a type of a cell in which the DCI format 3/3A is transmitted. Hence, a UE attempts to perform blind decoding in a manner that the UE differently assumes the payload size of the DCI format 3/3A according to a type (e.g., Pcell, ACell) of a cell intending to receive the DCI format 3/3A. It is also necessary for the UE to differently interpret the payload of the DCI format 3/3A. And, when PUSCH is transmitted in a cell (group) 1 and PUSCH is transmitted in a cell (group) 2, it may be able to differently configure a TPC command value and/or number of types (e.g., a TPC field size in UL grant). Whether to independently configure a TPC command value and/or number of types according to a cell (group) can be explicitly indicated via a higher layer signal (e.g., RRC signal) or can be indirectly indicated using different information (or parameter). For example, whether to independently configure a TPC command value and/or number of types according to a cell (group) can be indirectly indicated/configured according to whether or not inter-site CA is operated/configured or using multi-PUCCH ON/OFF. Specifically, if the inter-site CA is operated or configured and the multi-PUCCH is set to ON, it is able to independently configure a TPC command value and/or number of types according to a cell (group).

According to the related art, a TPC command of a DCI format 3/3A for controlling power of a UE group used to be applied to Pcell PUCCH/PUSCH transmission only. Yet, according to the present invention, it is able to designate a cell (group) in which PUCCH and/or PUSCH is transmitted via higher layer signaling (e.g., RRC signaling) to apply the TPC command of the DCI format 3/3A to the cell (group).

Meanwhile, it may be able to configure an operation of applying/accumulating a TPC command for a specific cell to be independently performed according to a UL SF (set) in consideration of an interference situation which is changing over time due to interference control between cells (and/or a different DL/UL resource configuration) in a (micro) cell environment (or similar cell environment) configured by a dense cluster form in a limited region. As an example, when a UL SF capable of transmitting PUCCH is divided into two SF sets (e.g., SF set 1 and SF set 2), a TPC command, which is signaled via a DL grant of a DL SF corresponding to the SF set 1, can be applied/accumulated for PUCCH transmission transmitted of the SF set 1 only and a TPC command, which is signaled via a DL grant of a DL SF corresponding to the SF set 2, can be applied/accumulated for PUCCH transmission of the SF set 2 only. As a different example, when a UL SF capable of transmitting PUSCH is divided into two SF sets (e.g., SF set 1 and SF set 2), a TPC command, which is signaled via a UL grant for scheduling the SF set 1, is applied/accumulated for PUSCH transmission of the SF set 1 only and a TPC command, which is signaled via a UL grant for scheduling the SF set 2, can be applied/accumulated for PUSCH transmission of the SF set 2 only. In this case, it may be able to configure/apply an independent TPC command value and/or number of types (e.g., an independent TPC field size) according to an SF (set). For example, it may be able to differently configure a TPC command and/or number of types (e.g., a TPC field size), which is signaled via a DL grant corresponding to PUCCH transmission (e.g., A/N) of the SF set 1 and PUCCH transmission (e.g., A/N) of the SF set 2. And, it may be able to differently configure a TPC command and/or number of types (e.g., a TPC field size), which is signaled via a UL grant for scheduling PUSCH transmission of the SF set 1 and PUSCH transmission of the SF set 2.

And, a UL SF to which a TPC command of a DCI format 3/3A is applied can be determined as follows.

Method 0) The TPC command can be applied to PUCCH/PUSCH transmitted in all UL SFs (sets).

Method 1) The TPC command can be automatically designated to be applied to PUCCH/PUSCH transmitted in a specific UL SF (set). For example, the specific UL SF (set) includes a UL SF (set) including a smallest (set) index (on higher layer (e.g., RRC) signaling/configuration).

Method 2) It is able to designate a UL SF (set) in which PUCCH/PUSCH is transmitted via higher layer signaling (e.g., RRC signaling) to apply the TPC command.

Method 3) If timing (i.e., 3/3A-TPC timing) at which the TPC command is transmitted/received belongs to a specific UL SF set and/or if the timing is associated with the specific UL SF set (e.g., if the 3/3A-TPC timing is matched with DL grant timing corresponding to the specific UL SF set and/or if the timing is matched with UL grant timing for scheduling the specific UL SF set), the TPC command can be applied to PUCCH/PUSCH transmission of the specific UL SF set. Otherwise (i.e., if the 3/3A-TPC timing does not belong to the specific SF set and/or if the 3/3A-TPC timing is not associated with the specific SF set), it may consider options described in the following. Option i) it may apply the 0), 1), or 2) method. Option ii) It may be able to apply the TPC command to PUCCH/PUSCH transmission of an SF set most adjacent to before or after the 3/3A-TPC timing (and/or timing to which a specific SF offset is added from the 3/3A-TPC timing). Option iii) It may not apply the TPC command to any SF set. As an implementation example of the option iii), a UE may operate under an assumption/consideration that a DCI format 3/3A (TPC command) is not transmitted/received via timing not belonging to the specific SF set or the timing not associated with the specific SF set. For example, the UE may be able to omit blind decoding on the DCI format 3/3A at the timing not belonging to the specific SF set or the timing not associated with the specific SF set.

Method 4) It may be able to assign an RNTI (e.g., TPC-PUSCH-RNTI and/or TPC-PUCCH-RNTI) used for (CRC) scrambling of the DCI format 3/3A according to an SF (set). A UE attempts to perform blind decoding on the DCI format 3/3A using the RNTI and may be able to apply a TPC command to PUCCH/PUSCH transmission of an SF (set) corresponding to a detected RNTI.

Information on whether or not a plurality of RNTIs and/or a plurality of TPC commands are used/assigned to the DCI format 3/3A can be explicitly indicated via a higher layer signal (e.g., RRC signal) or an L1/L2 signal (e.g., PDCCH signal) or can be indirectly indicated using other information (or a parameter). For example, the information on whether or not a plurality of RNTIs and/or a plurality of TPC commands are used/assigned to the DCI format 3/3A can be indirectly indicated/configured using information on whether or not inter-site CA is operated/configured or multi-PUCCH ON/OFF. Specifically, if the inter-site CA is operated/configured and/or if the multi-PUCCH is set to ON, a plurality of RNTIs and/or a plurality of TPC commands can be used/assigned in response to the DCI format 3/3A.

Meanwhile, in order to more properly and adaptively control/manage UL power in a CA situation that cells (groups) belonging to eNBs different from each other are aggregated with each other, the present invention proposes to additionally report UL transmission-related information of each cell (group), which is reflected at the time of determining a PHR, at the time of transmitting the PHR. In this case, the additional information on the UL transmission of each cell (group) can be reported via the PHR or can be reported irrespective of the PHR. For example, the UL transmission-related information of each cell (group) can include at least one selected from the group consisting of information on whether or not UL transmission is performed in each cell (group), a type of UL signal/channel (e.g., PUCCH, PUSCH, PRACH, SRS) transmitted via each cell (group), a type of UCI (e.g., A/N, SR, CSI) transmitted via each cell (group), information on a resource used for transmission (e.g., RB index/region), information on an applied modulation scheme (e.g., QPSK, 16-QAM, 64-QAM), and information on an applied specific parameter value (e.g., MPR (maximum power reduction)), A-MPR (additional-MPR)). And, a PHR type (e.g., a type 1 to which PUSCH power is reflected only or a type 2 to which both PUCCH power and PUSCH power are reflected) can be independently configured according to each cell (group). Hence, (if a PHR for a plurality of cells (groups) is transmitted at the same time), the additional information on the UL transmission of each cell (group) can further include a PHR type set to each cell (group). In this case, the information additionally reported at the time of reporting the PHR can be restricted to UL transmission information of a different cell group except a cell group of its own. As an example, in a situation that a cell group 1 and a cell group 2 are aggregated with each other to a single UE, the UE reports a PHR on all cell groups and the UL transmission-related information on the cell group 2 to the cell group 1 and the UE can report the PHR on all cell groups and the UL transmission-related information on the cell group 1 to the cell group 2.

Meanwhile, whether or not it is permitted to transmit a plurality of PUCCHs at the same time and/or whether or not it is permitted to transmit PUCCH and PUSCH at the same time can be configured according to an SF (set) in consideration of TDM-based UL transmission between cells/TPs (transmission points) including different coverage, UL channel/interference situation changing over time (due to the UL transmission), UL transmission signal distortion/deterioration, and the like. And, whether or not it is permitted to transmit CSI and A/N at the same time and/or relevant information (e.g., PUCCH resource allocation for periodically transmitting CSI, and the like) can be configured according to an SF (set). And, whether or not it is permitted to transmit SRS and A/N at the same time and/or relevant information (e.g., SRS transmission band/region allocation, relevant parameter configuration, and the like) can be configured according to an SF (set). And, whether or not (TxD-based) PUCCH transmission using a plurality of antennas is set and/or relevant information (e.g., PUCCH resource allocation, power control (offset) parameter configuration, and the like) can also be configured according an SF (set).

Meanwhile, in an inter-site CA situation, 1) if a method of transmitting all PHRs on all cells (groups) via each cell group is applied or 2) if a method of transmitting a PHR on a cell group itself via each cell group is applied, (as an extreme case), all UL transmit power controls are to be conservatively performed or aggressively performed in each cell group. When a plurality of cell groups are set to a single UE, it may consider a method for the UE to transmit all PHRs on all cells (groups) via a specific cell group (e.g., a Pcell group including Pcell) and transmit a PHR only on a corresponding cell group itself via the remaining cell group (e.g., an Scell group including Scell only) in consideration of the aforementioned situation. Hence, if the specific cell group is able to perform UL power control in consideration of potential UL transmit power from the rest of cell group, it may be able to transmit a relatively efficient UL signal in response to the all cell groups set to the single UE.

Meanwhile, in the aforementioned inter-site CA situation, in case of a command/response accompanied with an RRC configuration/reconfiguration procedure (e.g., Scell allocation/release, configuration of TM per cell, configuration of CSI feedback mode/SRS parameter per cell) related to each cell group (each cell belonging to a corresponding group), the command/response can be restricted to be transceived only via a Pcell group (a random cell belonging to a corresponding group) in charge of mobility management and RRC function/procedure of a UE. In this case, if an operation of transmitting and receiving an RRC (re)configuration command/response related to Scell group is performed via the Pcell group, since a backhaul between an eNB (i.e., MeNB) for controlling/managing the Pcell group and an eNB (i.e., SeNB) for controlling/managing the Scell group is not ideal, misalignment between RRC (re)configuration application timings (ambiguity due to the misalignment) may become relatively big in the UE and the SeNB. In consideration of this, the MeNB can inform the UE of information (e.g., SFN (system frame number), etc.) on a timing at which the configuration is applied or information (e.g., time delay/offset, etc. between timing at which RRC command is transmitted and timing at which the configuration is applied) capable of inferring the timing (in a manner of being included in the RRC command via the Pcell group) when (Scell group-related) RRC is (re)configured in the inter-site CA situation. The MeNB can inform the SeNB of the information (via backhaul signaling) and/or the SeNB can inform the MeNB of the information (via backhaul signaling). On the contrary, when RRC is (re)configured in relation to the Pcell group, it is not necessary to inform the UE of the information on the timing at which the configuration is applied.

Meanwhile, in the inter-site CA situation, TA information, which is applied to each cell group (each TAG belonging to a corresponding group), may have a structure independently signaled, controlled, and managed according to each cell group (i.e., eNB). In this case, a specific eNB may not be able to identify TA information which is applied to a cell group controlled/managed by a different eNB in the inter-site CA situation. As a result, it is probable that each eNB is unable to properly/efficiently anticipate/induce a UL power control and UL signal processing operation of a UE for the whole of the inter-site CA. In consideration of this, 1) the UE may report TA (or transmission timing)-related information, which is applied to a specific cell group (all or a specific TAG belonging to the specific cell group), to a different cell group, 2) the UE may report a TA difference among a plurality of cell groups (specific TAG belonging to each group) or information corresponding to a transmission timing difference to (all or a specific) cell group, or 3) a specific eNB can signal TA (or transmission timing)-related information which is applied to (all or a specific) TAG controlled/managed by the specific eNB to a different eNB (via backhaul). In this case, the specific TAG can be configured as a TAG including Pcell in case of a Pcell group. The specific TAG can be configured as a TAG including ACell in case of an Scell group.

<Restriction on the Number of Cells Capable of Performing CA>

In case of a legacy CA system that PUCCH on which UCI such as HARQ-ACK and the like are carried is transmitted via a single Pcell, in consideration of CA HARQ-ACK feedback transmission via a PUCCH format 3 that provides a biggest (e.g., maximum 20 bits) HARQ-ACK payload size, the number of cells capable of performing CA is restricted as follows.

1) When a DL HARQ timing reference for each cell is set to TDD UL/DL configuration 5, CA is supported/permitted only up to maximum 2 cells in response to a UE, 2) if there exists a cell of which TDD UL/DL configuration 5 is configured as a DL HARQ timing reference, CA is supported/permitted only up to maximum 2 cells in response to a UE (e.g., CA between TDD UL/DL configurations different from each other, CA between (cross-CC scheduling-based) TDD Pcell and FDD Scell, etc.)

3) CA is supported/permitted only up to the maximum number of cells that the sum (or the number of corresponding HARQ-ACK bits) of the number of HARQ-ACK feedback target DL SFs (and special SFs) to be transmitted via a single UL SF becomes 20 or less (e.g., CA between (self-CC scheduling-based) TDD Pcell and FDD Scell).

If a plurality of cell groups are set to a single UE and a PUCCH transmission cell (e.g., Pcell or ACell) is set according to each cell group in consideration of the aforementioned restriction, the present invention proposes to apply the scheme of restricting the number of cells capable of performing CA in a unit of a cell group. Specifically, 1) when a DL HARQ timing reference for each cell is set to TDD UL/DL configuration 5 in a cell group, CA is supported/permitted only up to maximum 2 cells in the cell group, and/or 2) if there exists a cell of which TDD UL/DL configuration 5 is configured as a DL HARQ timing reference in a cell group, CA is supported/permitted only up to maximum 2 cells in the cell group, and/or 3) CA is supported/permitted only up to the maximum number of cells that the sum (or the number of corresponding HARQ-ACK bits) of the number of HARQ-ACK feedback target DL SFs (and special SFs) (or the number of HARQ-ACK bits corresponding to the maximum number of cells) to be transmitted via a single UL SF becomes 20 or less in the cell group in response to each of a plurality of the cell groups set to a single UE (instead of the single UE).

If the aforementioned proposal is applied, when there exists a cell of which TDD UL/DL configuration 5 is configured as a DL HARQ timing reference, it is able to support/permit CA among three or more cells in response to a single UE. As an example, when 2 cell groups (e.g., Pcell group and Scell group) are set to a single UE and an ACell is set to the Scell group, if there exists a cell of which DL HARQ timing reference is set to TDD UL/DL configuration 5 in each of the cell groups, since CA is available up to maximum 2 cells in each cell group, as a result, it is able to perform CA up to maximum 4 cells in response to a single UE. As a different example, in the same situation (operating based on a TDD cell), if there exists a cell of which DL HARQ reference is set to TDD UL/DL configuration 5 in the Pcell group only, CA is available up to maximum 2 cells in the Pcell group. On the contrary, CA is available among two or more cells in the Scell group. Consequently, CA becomes available among 4 or more cells in response to a single UE.

Although the present invention is explained in a manner of assuming a CA situation between two cells for clarity, the principle proposed by the present invention can also be identically/similarly applied to a CA situation among a plurality of cells equal to or greater than 3 cells. The principle proposed by the present invention can also be applied to a situation that UCI transmission is performed according to a cell group in a CA situation among a plurality of cell groups (each of which is configured by one or more cells) in a manner of being extended/modified. In other word, in the present invention, one cell can be replaced or considered with/as a cell group or a specific cell belonging to the cell group. The principle proposed by the present invention can be extensively applied to a situation that CA is performed on two or more cells or cell groups. And, in the present invention, Pcell may correspond to a cell in which PUCCH-based A/N or UCI transmission is designated or configured to be performed. On the contrary, Scell may correspond to a cell in which PUCCH-based A/N or UCI transmission is not designated or configured to be performed. And, application of the present invention may be non-limited by the inter-site CA situation (between eNBs different from each other). The principle proposed by the present invention can also be identically applied to (identical eNB-based) legacy CA situation.

Figure 16:
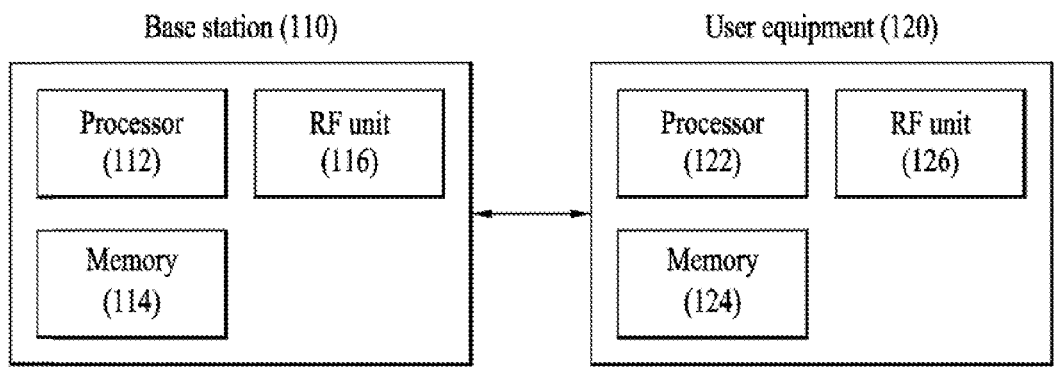
FIG. 16 illustrates a base station and a UE applicable to the present invention.

FIG. 16 is a diagram for an example of a base station and a user equipment applicable to the present invention. In case that a system includes a relay, the base station or the user equipment can be replaced by the relay.

Referring to FIG. 16, a wireless communication system includes a base station (BS) 110 and a user equipment (UE) 120. The base station 110 includes a processor 112, a memory 114 and a radio frequency (RF) unit 116. The processor 112 can be configured to implement the procedure and/or methods proposed by the present invention. The memory 114 is connected to the processor 112 and configured to store various information related to the operation of the processor 112. The RF unit 116 is connected to the processor 112 and configured to transmit and/or receive a radio signal. The user equipment 120 includes a processor 122, a memory 124 and a radio frequency (RF) unit 126. The processor 122 can be configured to implement the procedure and/or methods proposed by the present invention. The memory 124 is connected to the processor 122 and configured to store various information related to the operation of the processor 122. The RF unit 126 is connected to the processor 122 and configured to transmit and/or receive a radio signal. The base station 110 and/or the user equipment 120 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the signal transmission/reception relations between a user equipment and a base station. In this disclosure, a specific operation explained as performed by a base station can be occasionally performed by an upper node of the base station. In particular, in a network constructed with a plurality of network nodes including a base station, it is apparent that various operations performed for communication with a user equipment can be performed by a base station or other networks except the base station. In this case, 'base station' can be replaced by such a terminology as a fixed station, a Node B, an eNode B (eNB), an access point, and the like. And, 'user equipment' can be replaced by such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Accordingly, the present invention can be used by such a wireless communication device as a user equipment device, a relay, a base station, and the like.

What is claimed is:

1. A method of controlling uplink power, which is controlled by a user equipment in a wireless communication system, the method comprising:
adjusting transmit power of at least one or more cells belonging to a first cell group to keep a transmit power of the first cell group from exceeding a maximum power limit set to the first cell group;
adjusting transmit power of at least one or more cells belonging to a second cell group to keep a transmit power of the second cell group from exceeding a maximum power limit set to the second cell group;
when total transmit power of all cell groups containing the first cell group and the second cell group exceeds a maximum power limit set to the user equipment, additionally reducing the transmit power of the first cell group and the transmit power of the second cell group; and
performing uplink transmission in the first cell group and the second cell group using the additionally reduced transmit power,
wherein the transmit power of the first cell group and the transmit power of the second cell group are reduced using a scaling factor per cell group, and
wherein the scaling factor per cell group is configured in proportion to a number of cells belonging to each cell group.

2. The method of claim 1, wherein the scaling factor per cell group is configured in proportion to a number of activated cells among a plurality of cells constructing each cell group.

3. The method of claim 1, wherein the transmit power of the first cell group is additionally reduced so as to be equal to or less than a value determined as follows:

$$(P_{cg\text{-}1}/P_{cg\text{-}sum}) \times P_{ue\text{-}max},$$

where, $P_{cg\text{-}1}$ corresponds to the transmit power of the first cell group, $P_{cg\text{-}sum}$ corresponds to the total transmit power of all cell groups, and $P_{ue\text{-}max}$ corresponds to the maximum power limit set to the user equipment.

4. The method of claim 1, wherein at least one of the first cell group and the second cell group comprises a plurality of cells.

5. A user equipment configured to control uplink power in a wireless communication system, the user equipment comprising:
a radio frequency (RF) unit; and
a processor configured to:
adjust transmit power of at least one or more cells belonging to a first cell group to keep a transmit power of the first cell group from exceeding a maximum power limit set to the first cell group,
adjust transmit power of at least one or more cells belonging to a second cell group to keep a transmit power of the second cell group from exceeding a maximum power limit set to the second cell group,
when total transmit power of all cell groups containing the first cell group and the second cell group exceeds a maximum power limit set to the user equipment, additionally reduce the transmit power of the first cell group and the transmit power of the second cell group, and
control the RF unit to perform uplink transmission in the first cell group and the second cell group using the additionally reduced transmit power,
wherein the transmit power of the first cell group and the transmit power of the second cell group are reduced using a scaling factor per cell group, and wherein the scaling factor per cell group is configured in proportion to a number of cells belonging to each cell group.

6. The user equipment of claim 5, wherein the scaling factor per cell group is configured in proportion to a number of activated cells among a plurality of cells constructing each cell group.

7. The user equipment of claim 5, wherein the transmit power of the first cell group is additionally reduced so as to be equal to or less than a value determined as follows:

$$(P_{cg-1}/P_{cg-sum}) \times P_{ue-max},$$

where, $P_{cg-1}$ corresponds to the transmit power of the first cell group, $P_{cg-sum}$ corresponds to the total transmit power of all cell groups, and $P_{ue-max}$ corresponds to the maximum power limit set to the user equipment.

8. The user equipment of claim 5, wherein at least one of the first cell group and the second cell group comprises a plurality of cells.

\* \* \* \* \*